United States Patent
Kuroda et al.

[11] Patent Number: 5,854,713
[45] Date of Patent: *Dec. 29, 1998

[54] REFLECTION TYPE ANGLE OF VIEW TRANSFORMING OPTICAL APPARATUS

[75] Inventors: Takeshi Kuroda; Akito Takeya; Kenichi Nishiguchi; Akira Ichikawa, all of Hyogo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 691,418

[22] Filed: Aug. 2, 1996

Related U.S. Application Data

[63] Continuation of Ser. No. 256,693, Jul. 20, 1994, abandoned.

[30] Foreign Application Priority Data

Nov. 30, 1992 [JP] Japan ..................................... 4-341103

[51] Int. Cl.⁶ .............................. G02B 5/08; G02B 5/10; G02B 21/00; G02B 17/00
[52] U.S. Cl. ......................... 359/850; 359/851; 359/852; 359/859; 359/381; 359/384; 359/364; 359/850; 250/234; 250/342
[58] Field of Search ..................................... 359/850, 851, 359/852, 853, 859, 863, 866, 873, 381, 384, 364, 292, 556, 557, 858, 366, 365, 727, 731, 857; 250/234, 342

[56] References Cited

U.S. PATENT DOCUMENTS

| | | | |
|---|---|---|---|
| 3,754,998 | 8/1973 | Stripling et al. | 250/234 |
| 3,887,263 | 6/1975 | Thompson, III | 359/203 |
| 3,977,787 | 8/1976 | Fletcher et al. | 356/106 S |
| 4,282,527 | 8/1981 | Winderman et al. | 343/725 |
| 4,427,878 | 1/1984 | Buchtel et al. | 250/203 R |
| 4,514,630 | 4/1985 | Takahashi | 250/342 |
| 4,514,631 | 4/1985 | Guscott | 250/342 |
| 4,693,068 | 9/1987 | Lillquist et al. | 358/44 |
| 4,695,139 | 9/1987 | Bagby et al. | 359/620 |
| 4,801,212 | 1/1989 | Imura | 359/364 |
| 4,883,348 | 11/1989 | Spivey et al. | 359/364 |
| 5,047,788 | 9/1991 | Gillard | 343/915 |
| 5,107,526 | 4/1992 | Hoover | 378/43 |
| 5,144,497 | 9/1992 | Kato et al. | 359/859 |
| 5,181,145 | 1/1993 | Eden | 359/859 |
| 5,191,469 | 3/1993 | Margolis | 359/366 |
| 5,386,316 | 1/1995 | Cook | 359/365 |

FOREIGN PATENT DOCUMENTS 4667636 12/1990 Japan .
1615661 12/1990 U.S.S.R. .

*Primary Examiner*—Cassandra C. Spyrou
*Assistant Examiner*—Mohammad Y. Sikder
*Attorney, Agent, or Firm*—Wolf, Greenfield & Sacks, P.C.

[57] ABSTRACT

In a reflection type angle of view transforming optical apparatus for transforming an angle of view in an image apparatus and so forth, sufficient strength can be provided and process is facilitated by using reflecting mirrors in a wide angle optical system. The reflection type angle of view transforming optical apparatus includes a primary mirror 8 having a reflecting surface provided in an axisymmetric form to reflect incident light 12 as primary reflected light 13, a secondary mirror 10 having a reflecting surface provided in an axisymmetric form about the same axis of rotational symmetry 9 as that of the primary mirror 8, opposed to the primary mirror 8 so as to reflect the primary reflected light 13 and to get secondary reflected light 14 for focusing on a view point, and a transparent case 11 to support the primary mirror 8 and the secondary mirror 10, and transmit the incident light 12.

21 Claims, 19 Drawing Sheets

REFLECTION TYPE ANGLE OF VIEW TRANSFORMING OPTICAL APPARATUS

This application is a continuation of application Ser. No. 08/256,693, which is the U.S. National Phase of PCT/JP93/01743, filed Nov. 30, 1993.

TECHNICAL FIELD

The present invention relates to a reflection type angle of view transforming optical apparatus for transforming an angle of view in an image apparatus and so forth.

BACKGROUND ART

FIG. 31 is a sectional view showing a conventional super wide angle (fish-eye) lens disclosed in, for example, Japanese Patent Publication (Kokoku) No. 50-30457. In the drawing, reference numeral 1 means an optical axis of incident light reaching from an object (not shown) disposed in a left direction of the drawing, and 2 is a refractive lens to refract the incident light from the object. The super wide angle lens composes a refractive optical system, and can be mounted on a single-lens reflex camera so as to take a 180° angle of view in a diagonal direction of Leica size.

Further, FIG. 32 is a sectional view showing reflecting mirrors of a Cassegrainian reflector shown in, for example, "Telescopic Optics for Amateur of Astronomy/Reflection" Shotaro Yoshida, Seibundo Shinkosha, p.55, (1988), as an example of an optical system having a narrow angle of view, but employing the reflecting mirrors. In the drawing, reference numeral 3 means a primary mirror, 4 is a secondary mirror, 5 is the incident light reaching from the object, 6 is a focus of reflected light which is reflected off the primary mirror 3, and 7 is a focus of reflected light which is further reflected off the secondary mirror 4. In the Cassegrainian reflector, it is possible to observe the object by watching an image formed on an image formation surface at the focus 7.

The conventional super wide angle lens is provided as described above. In order to use the super wide angle lens for an infrared imaging apparatus or the like having a low contrast, a high luminance lens, that is, a large aperture lens is required. However, there is a problem in that the manufacturing of a large aperture lens of the refractive optical system as shown in FIG. 31 is difficult due to homogeneity and strength of a glass. Further, there are other problems of difficult machining such as polishing required for both sides of the lens, and of a cost increased due to difficulty in manufacturing and machining the lens.

In the telescopic optics as shown in FIG. 32, these problems are solved by employing the reflecting mirrors such as the primary mirror 3, and the secondary mirror 4. However, the problems have not been solved yet in a wide angle optical system.

The present invention is made to overcome the above problems. It is an object of the present invention to provide a reflection type angle of view transforming optical apparatus which has suitable strength and facilitates the machining by using the reflecting mirrors in the wide angle optical system.

DISCLOSURE OF THE INVENTION

According to the present invention, a reflection type angle of view transforming optical apparatus includes a primary mirror having a reflecting surface provided in an axisymmetric form to reflect incident light as primary reflected light, a secondary mirror having a reflecting surface provided in an axisymmetric form about the same axis of rotational symmetry as that of the primary mirror, opposed to the primary mirror so as to reflect the primary reflected light as secondary reflected light for focusing on a view point, and a supporting member to support the primary mirror and the secondary mirror and transmit the incident light. Thereby, the primary mirror and the secondary mirror are used to reflect the incident light in a wide angle as the primary reflected light from the primary mirror to the secondary mirror, and focus the primary reflected light from the secondary mirror on the view point as the secondary reflected light. Thus, it is possible to focus the wide angle incident light on the view point. Further, the primary mirror and the secondary mirror can be processed by material such as metal.

Further, according to the present invention, a reflection type angle of view transforming optical apparatus includes a primary mirror having a reflecting surface provided in an axisymmetric form, and including a plurality of different partial mirrors disposed concentrically to reflect incident light as primary reflected light, a secondary mirror having a reflecting surface provided in an axisymmetric form about the same axis of rotational symmetry as that of the primary mirror, opposed to the primary mirror so as to reflect the primary reflected light as secondary reflected light for focusing on a view point, and a supporting/movable member to support at least one of the primary mirror and the secondary mirror slidably in a direction of the axis of rotational symmetry, and transmit incident light.

Thereby, the primary mirror and the secondary mirror are used to reflect the incident light incident in a wide angle as the primary reflected light from the primary mirror to the secondary mirror, and focus the primary reflected light from the secondary mirror on the view point as the secondary reflected light. Thus, it is possible to focus the wide angle incident light on the view point. In addition, it is possible to focus different wide angle incident lights on the view point by using the supporting/movable member to adjust an interval between the primary mirror and the secondary mirror according to angles of the primary reflected light reflected from different partial mirrors of the primary mirror which are concentrically disposed. Further, the primary mirror and the secondary mirror can be processed by material such as metal.

Further, according to the present invention, a reflection type angle of view transforming optical apparatus includes a plurality of primary mirrors having a reflecting surface provided in an axisymmetric form to reflect incident light as primary reflected light, a secondary mirror having a reflecting surface provided in an axisymmetric form, selectively combined with one of the plurality of primary mirrors, and opposed to the primary mirror so as to reflect the primary reflected light from the primary mirror as secondary reflected light for focusing on a view point, and a supporting/rotatable member to support the secondary mirror, support the plurality of primary mirrors rotatably about an axis of rotation in an arbitrarily set direction, selectively combine one of the primary mirrors with the secondary mirror according to a rotation position so as to conform an axis of rotational symmetry of the primary mirror to an axis of rotational symmetry of the secondary mirror, and transmit the incident light. In addition, reflecting surfaces of the plurality of primary mirrors are formed to provide different relationships between an angle between the axis of rotational symmetry of both the mirrors in combination of the respective primary mirrors and the secondary mirror and the incident light, and an angle between the axis of rotational symmetry and the secondary reflected light.

Thereby, the primary mirror and the secondary mirror are used to reflect the incident light incident in a wide angle as the primary reflected light from the primary mirror to the secondary mirror, and focus the primary reflected light from the secondary mirror on the view point as the secondary reflected light. Thus, it is possible to focus the wide angle incident light on the view point. In addition, reflecting surfaces of the plurality of primary mirrors are formed to provide the different relationships between the angle between the axis of rotational symmetry and the incident light, and the angle between the axis of rotational symmetry and the secondary reflected light. The primary mirrors can be switched over by the supporting/rotatable member to focus different wide angle incident lights on the view point. Further, the primary mirror and the secondary mirror can be processed by material such as metal.

Further, according to the present invention, a reflection type angle of view transforming optical apparatus includes a primary mirror having a reflecting surface provided in an axisymmetric form to reflect incident light as primary reflected light, a plurality of secondary mirrors having a reflecting surface provided in an axisymmetric form, selectively combined with the primary mirror to reflect the primary reflected light as secondary reflected light for focusing on a view point, and a supporting/rotatable member to support the primary mirror, support the plurality of secondary mirrors rotatably about an axis of rotation extending in an arbitrarily set direction, selectively combine one of the secondary mirrors with the primary mirror according to a rotation position so as to conform an axis of rotational symmetry of the secondary mirror to an axis of rotational symmetry of the primary mirror, and transmit the incident light. In addition, reflecting surfaces of the plurality of secondary mirrors are formed to provide different relationships between an angle between the axis of rotational symmetry of both the mirrors in combination of the respective secondary mirrors and the primary mirror and the incident light, and an angle between the axis of rotational symmetry and the secondary reflected light. Thereby, the primary mirror and the secondary mirror are used to reflect the incident light incident in a wide angle as the primary reflected light from the primary mirror to the secondary mirror, and focus the primary reflected light from the secondary mirror on the view point as the secondary reflected light. Thus, it is possible to focus the wide angle incident light on the view point. In addition, reflecting surfaces of the plurality of secondary mirrors are formed to provide the different relationships between the angle between the axis of rotational symmetry and the incident light, and the angle between the axis of rotational symmetry and the secondary reflected light. The secondary mirrors can be switched over by the supporting/rotatable member to focus different wide angle incident lights on the view point. Further, the primary mirror and the secondary mirror can be processed by material such as metal.

Further, according to the present invention, a reflection type angle of view transforming optical apparatus includes a plurality of primary mirrors having a reflecting surface provided in an axisymmetric form to reflect incident light as primary reflected light, a secondary mirror having a reflecting surface provided in an axisymmetric form, selectively combined with one of the plurality of primary mirrors to reflect the primary reflected light from the primary mirror as secondary reflected light for focusing on a view point, and a supporting/movable member to support the secondary mirror, support the plurality of primary mirrors slidably in an arbitrarily set direction, selectively combine one of the primary mirrors with the secondary mirror according to a sliding position so as to conform an axis of rotational symmetry of the primary mirror to an axis of rotational symmetry of the secondary mirror, and transmit the incident light. In addition, reflecting surfaces of the plurality of primary mirrors are formed to provide different relationships between an angle between the axis of rotational symmetry of both the mirrors in combination of the respective primary mirrors and the secondary mirror and the incident light, and an angle between the axis of rotational symmetry and the secondary reflected light. Thereby, the primary mirror and the secondary mirror are used to reflect the incident light incident in a wide angle as the primary reflected light from the primary mirror to the secondary mirror, and focus the primary reflected light from the secondary mirror on the view point as the secondary reflected light. Thus, it is possible to focus the wide angle incident light on the view point. In addition, the reflecting surfaces of the plurality of primary mirrors are formed to provide the different relationships between the angle between the axis of rotational symmetry and the incident light, and the angle between the axis of rotational symmetry and the secondary reflected light. The primary mirrors can be switched over by the supporting/movable member to focus different wide angle incident lights on the view point. Further, the primary mirror and the secondary mirror can be processed by material such as metal.

Further, according to the present invention, a reflection type angle of view transforming optical apparatus includes a primary mirror having a reflecting surface provided in an axisymmetric form to reflect incident light as primary reflected light, a plurality of secondary mirrors respectively having a reflecting surface provided in an axisymmetric form, selectively combined with the primary mirror to reflect the primary reflected light from the primary mirror as secondary reflected light for focusing on a view point, and a supporting/movable member to support the primary mirror, support the plurality of secondary mirrors slidably in an arbitrarily set direction, selectively combine one of the secondary mirrors with the primary mirror according to a sliding position so as to conform an axis of rotational symmetry of the secondary mirror to an axis of rotational symmetry of the primary mirror, and transmit the incident light. In addition, reflecting surfaces of the plurality of secondary mirrors are formed to provide different relationships between an angle between the axis of rotational symmetry of both the mirrors in combination of the respective secondary mirrors and the primary mirror and the incident light, and an angle between the axis of rotational symmetry and the secondary reflected light. Thereby, the primary mirror and the secondary mirror are used to reflect the incident light incident in a wide angle as the primary reflected light from the primary mirror to the secondary mirror, and focus the primary reflected light from the secondary mirror on the view point as the secondary reflected light. Thus, it is possible to focus the wide angle incident light on the view point. In addition, reflecting surfaces of the plurality of secondary mirrors are formed to provide the different relationships between the angle between the axis of rotational symmetry and the incident light, and the angle between the axis of rotational symmetry and the secondary reflected light. The secondary mirrors can be switched over by the supporting/movable member to focus different wide angle incident lights on the view point. Further, the primary mirror and the secondary mirror can be processed by material such as metal.

Further, according to the present invention, a reflection type angle of view transforming optical apparatus includes a primary mirror having a reflecting surface provided in an axisymmetric form to reflect incident light as primary reflected light, a secondary mirror having a reflecting surface provided in an axisymmetric form about the same axis of rotational symmetry as that of the primary mirror so as to reflect the primary reflected light from the primary mirror as secondary reflected light for focusing on a view point, and a supporting/movable member to support at least one of the primary mirror and the secondary mirror slidably in a direction of the axis of rotational symmetry, and transmit the incident light. In addition, reflecting surfaces of the primary mirror and the secondary mirror are formed such that a relationship between an angle between the axis of rotational symmetry and the incident light, and an angle between the axis of rotational symmetry and the secondary reflected light is varied according to an interval between the primary mirror and the secondary mirror slid by the supporting/movable member. Thereby, the primary mirror and the secondary mirror are used to reflect the incident light incident in a wide angle as the primary reflected light from the primary mirror to the secondary mirror, and focus the primary reflected light from the secondary mirror on the view point as the secondary reflected light. Thus, it is possible to focus the wide angle incident light on the view point. In addition, the interval between the primary mirror and the secondary mirror is adjusted by the supporting/movable member to vary an angle of the incident light into the primary mirror, an angle of the primary reflected light into the secondary mirror, and an angle of the secondary reflected light into the view point. As a result, it is possible to focus different wide angle incident lights on the view point. Further, the primary mirror and the secondary mirror can be processed by material such as metal.

Further, according to the present invention, a reflection type angle of view transforming optical apparatus includes a primary mirror having a reflecting surface provided in an axisymmetric form to reflect incident light as primary reflected light, a secondary mirror having a reflecting surface provided in an axisymmetric form about the same axis of rotational symmetry as that of the primary mirror so as to reflect the primary reflected light from the primary mirror as secondary reflected light for focusing on a view point, and a supporting member to support the primary mirror and the secondary mirror, and transmit the incident light. In addition, at least one of the primary mirror and the secondary mirror is provided with a transmitting portion to pass the incident light from an object thereof. Thereby, the primary mirror and the secondary mirror are used to reflect the incident light incident in a wide angle as the primary reflected light from the primary mirror to the secondary mirror, and focus the primary reflected light from the secondary mirror on the view point as the secondary reflected light. Thus, it is possible to focus the wide angle incident light on the view point. In addition, at least one of the primary mirror and the secondary mirror is provided with the transmitting portion to transmit the incident light, and the view point can be irradiated with incident light passing through the transmitting portion together with the reflected light reflected from the primary mirror and the secondary mirror for focusing on the view point. Further, the primary mirror and the secondary mirror can be processed by material such as metal.

Further, according to the present invention, a reflection type angle of view transforming optical apparatus includes a primary mirror having a reflecting surface provided in an axisymmetric form to reflect incident light as primary reflected light, a secondary mirror having a reflecting surface provided in an axisymmetric form about the same axis of rotational symmetry as that of the primary mirror so as to reflect the primary reflected light from the primary mirror as secondary reflected light for focusing on a view point, and a supporting member to support the primary mirror and the secondary mirror, and transmit the incident light. In addition, at least one of the primary mirror and the secondary mirror is provided with a transmitting portion, and a plane mirror is rotatably supported to refract the incident light from the object to the secondary mirror or the view point through the transmitting portion. Thereby, the primary mirror and the secondary mirror are used to reflect the incident light incident in a wide angle as the primary reflected light from the primary mirror to the secondary mirror, and focus the primary reflected light from the secondary mirror on the view point as the secondary reflected light. Thus, it is possible to focus the wide angle incident light on the view point. In addition, at least one of the primary mirror and the secondary mirror is provided with the transmitting portion to transmit the incident light which is reflected from the plane mirror, and the view point can be irradiated with incident light passing through the transmitting portion together with the reflected light reflected from the primary mirror and the secondary mirror for focusing on the view point. Besides, it is possible to vary a direction of the incident light passing through the transmitting portion by rotating the plane mirror which is rotatably supported. Further, the primary mirror and the secondary mirror can be processed by material such as metal.

Further, according to the present invention, a reflection type angle of view transforming optical apparatus includes a primary mirror having a reflecting surface provided in an axisymmetric form to reflect incident light as primary reflected light, a secondary mirror having a reflecting surface provided in an axisymmetric form about the same axis of rotational symmetry as that of the primary mirror so as to reflect the primary reflected light from the primary mirror as secondary reflected light for focusing on a view point, and a supporting member to support the primary mirror and the secondary mirror, and transmit the incident light. In addition, at least one of the primary mirror and the secondary mirror is divided into a plurality of pieces in a circumferential direction of the axis of rotational symmetry, and the plurality of divided reflecting surfaces are formed to provide different relationships between an angle between the axis of rotational symmetry and the incident light, and an angle between the axis of rotational symmetry and the secondary reflected light. Thereby, the primary mirror and the secondary mirror are used to reflect the incident light incident in a wide angle as the primary reflected light from the primary mirror to the secondary mirror, and focus the primary reflected light from the secondary mirror on the view point as the secondary reflected light. Thus, it is possible to focus the wide angle incident light on the view point. In addition, in the reflecting surface divided into the plurality of pieces in a circumferential direction of a rotation axis of at least one of the primary mirror and the secondary mirror, it is possible to concurrently focus different types of wide angle incident lights on the view point. Further, the primary mirror and the secondary mirror can be processed by material such as metal.

Further, according to the present invention, a reflection type angle of view transforming optical apparatus includes a primary mirror having a reflecting surface provided in an axisymmetric form to reflect incident light as primary reflected light, a secondary mirror having a reflecting surface provided in an axisymmetric form about the same axis of rotational symmetry as that of the primary mirror so as to reflect the primary reflected light from the primary mirror as secondary reflected light for focusing on a view point, a supporting/rotatable drive member to support the primary mirror and the secondary mirror so as to rotationally drive about an axis of rotational symmetry, and transmit the incident light from an object, and a storage section to store the secondary reflected light focused on the view point. At least one of the primary mirror and the secondary mirror is divided into a plurality of pieces in a circumferential direction of the axis of rotational symmetry, and the plurality of divided reflecting surfaces are formed to provide different relationships between an angle between the axis of rotational symmetry and the incident light, and an angle between the axis of rotational symmetry and the secondary reflected light. Thereby, the primary mirror and the secondary mirror are used to reflect the incident light incident in a wide angle as the primary reflected light from the primary mirror to the secondary mirror, and focus the primary reflected light from the secondary mirror on the view point as the secondary reflected light. Thus, it is possible to focus the incident light in a wide angle on the view point. In addition, it is possible to use the supporting/rotatable drive member so as to rotate the reflecting surfaces divided into the plurality of pieces in a circumferential direction of the axis of rotational symmetry of at least one of the primary mirror and the secondary mirror, and store the secondary reflected light focused on the view point in the storage section. It is thereby possible to obtain the incident lights having different types of angles of view over an entire area about the axis of rotational symmetry. Further, the primary mirror and the secondary mirror can be processed by material such as metal.

Further, according to the present invention, a reflection type angle of view transforming optical apparatus includes a primary mirror having a reflecting surface provided in an axisymmetric form to reflect incident light as primary reflected light, a secondary mirror having a reflecting surface provided in an axisymmetric form about the same axis of rotational symmetry as that of the primary mirror so as to reflect the primary reflected light as secondary reflected light for focusing on a view point, and a supporting member to support the primary mirror and the secondary mirror, and transmit the incident light. At least one of the primary mirror and the secondary mirror is divided into a plurality of different partial mirrors disposed concentrically, and reflecting surfaces of the plurality of divided partial mirrors are formed to provide different relationships between an angle between the axis of rotational symmetry and the incident light, and an angle between the axis of rotational symmetry and the secondary reflected light. Thereby, the primary mirror and the secondary mirror are used to reflect the incident light incident in a wide angle as the primary reflected light from the primary mirror to the secondary mirror, and focus the primary reflected light from the secondary mirror on the view point as the secondary reflected light. Thus, it is possible to focus the wide angle incident light on the view point. In addition, in the plurality of reflecting surfaces divided in a concentric manner of at least one of the primary mirror and the secondary mirror, it is possible to concurrently focus different types of wide angle incident lights on the view point. Further, the primary mirror and the secondary mirror can be processed by material such as metal.

Further, according to the present invention, a reflection type angle of view transforming optical apparatus includes a primary mirror having a reflecting surface provided in an axisymmetric form to reflect incident light as primary reflected light, a secondary mirror having a reflecting surface provided in an axisymmetric form about the same axis of rotational symmetry as that of the primary mirror so as to reflect the primary reflected light from the primary mirror as secondary reflected light for focusing on a view point, and a supporting member to support the primary mirror and the secondary mirror, and transmit the incident light from an object. At least one of the primary mirror and the secondary mirror is made of flexible material, and a drive unit is provided to deform the mirror made of the flexible material. Thereby, the primary mirror and the secondary mirror are used to reflect the incident light incident in a wide angle as the primary reflected light from the primary mirror to the secondary mirror, and focus the primary reflected light from the secondary mirror on the view point as the secondary reflected light. Thus, it is possible to focus the wide angle incident light on the view point. Further, at least one of the primary mirror and the secondary mirror is made of the flexible material, and the mirror is deformed by the drive unit so as to focus infinitely different types of wide angle incident lights on the view point.

Further, according to the present invention, a reflection type angle of view transforming optical apparatus includes a primary mirror having a reflecting surface provided in an axisymmetric form to reflect incident light as primary reflected light, a secondary mirror having a reflecting surface provided in an axisymmetric form about the same axis of rotational symmetry as that of the primary mirror so as to reflect the primary reflected light from the primary mirror as secondary reflected light for focusing on a view point, and a supporting member to support the primary mirror and the secondary mirror, and transmit the incident light from an object. The supporting member is formed such that a transmitting surface extends perpendicular to all of the incident lights focused on the view point. Thereby, the primary mirror and the secondary mirror are used to reflect the incident light incident in a wide angle as the primary reflected light from the primary mirror to the secondary mirror, and focus the primary reflected light from the secondary mirror on the view point as the secondary reflected light. Thus, it is possible to focus the wide angle incident light on the view point. Further, the supporting member to support the primary mirror and the secondary mirror and transmit the incident light is formed such that the transmitting surface extends perpendicular to all of the incident lights focused on the view point. Therefore, the incident light can pass through the supporting member without refraction. Further, the primary mirror and the secondary mirror can be processed by material such as metal.

Further, according to the present invention, a primary mirror and a secondary mirror are supported by a supporting member, a supporting/rotatable member, a supporting/ movable member or a supporting/rotatable drive member, and at least one of the primary mirror and the secondary mirror is exchangeable for a mirror having a different reflecting surface form. Thereby, the primary mirror and the secondary mirror are used to reflect the incident light incident in a wide angle as the primary reflected light from the primary mirror to the secondary mirror, and focus the primary reflected light from the secondary mirror on the view point as the secondary reflected light. Thus, it is possible to focus the wide angle incident light on the view point. Further, at least one of the primary mirror and secondary mirror is exchangeable for the mirror having the reflecting surface provided in the different form. It is thereby possible to focus infinitely different types of wide angle incident lights on the view point. In addition, the primary mirror and the secondary mirror can be processed by material such as metal.

BEST MODE FOR EMBODYING THE INVENTION

Figure 1:
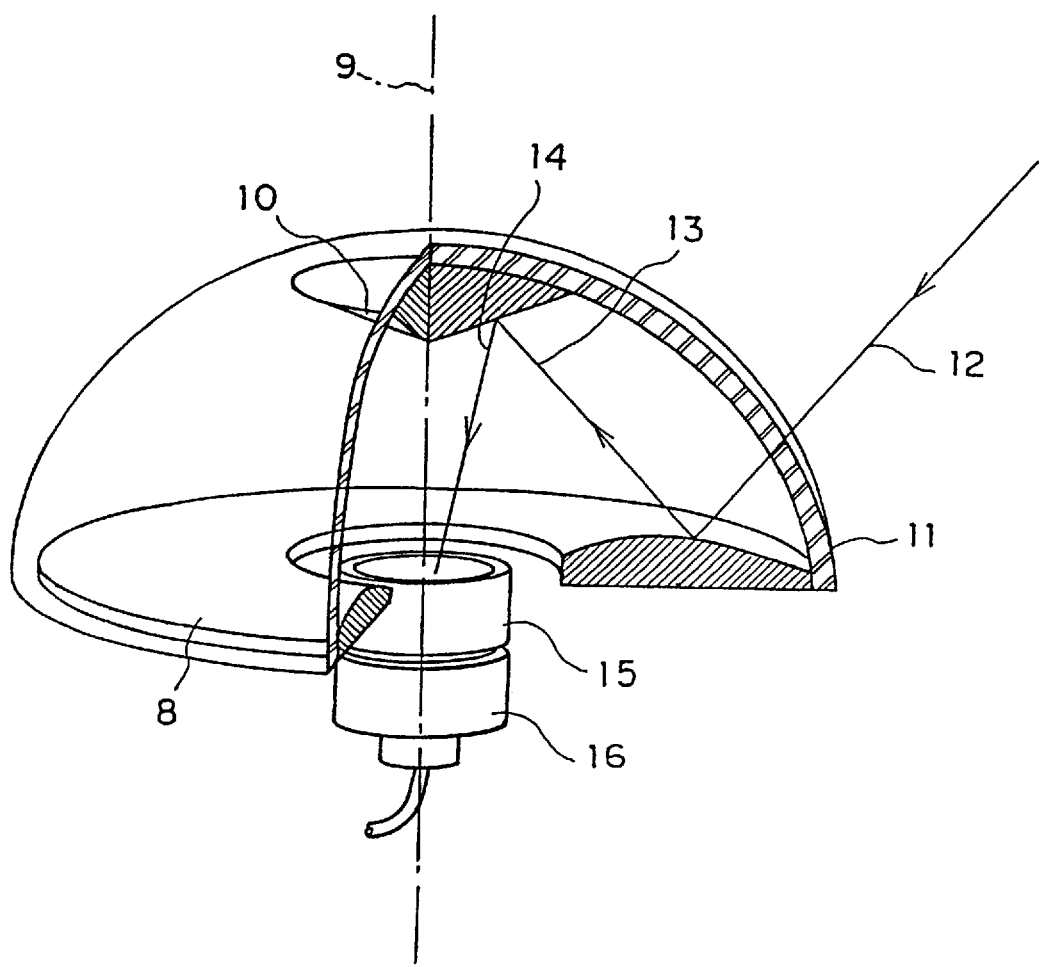
FIG. 1 is a structural view, partly in section, showing one embodiment of a reflection type angle of view transforming optical apparatus of the present invention.

A description will now be given of embodiments of a reflection type angle of view transforming optical apparatus of the present invention with reference to the drawings. FIG. 1 is a structural view, partly in section, showing one embodiment of the reflection type angle of view transforming optical apparatus of the present invention. In the drawing, reference numeral 8 denotes a primary mirror having a reflecting surface which is rotationally about the axis of rotational symmetry 9, and 10 denotes a secondary mirror having a reflecting surface which is rotationally symmetric about the axis of rotational symmetry 9 as in the case of the primary mirror 8, and is oppositely disposed on the side of an object (not shown) with respect to the primary mirror 8. As illustrated, the secondary mirror 10 can have a conical shape extending toward the primary mirror 8 along the axis of rotational symmetry 9. Reference numeral 11 means a transparent cover to support the primary mirror 8 and the secondary mirror 10, and serve as a supporting member for transmission of incident light 12 from the object. Reference numeral 13 means primary reflected light which is reflected off the primary mirror 8, 14 is secondary reflected light which is reflected off the secondary mirror 10, 15 is a lens fixed on the primary mirror 8 about the axis of rotational symmetry 9, and 16 is a CCD camera to which the lens 15 is attached.

A description will now be given of the operation. The incident light 12 reaches from the object existing in a wide angle, and is reflected from the primary mirror 8 as the primary reflected light 13 to the secondary mirror 10. Further, the primary reflected light 13 is focused on the lens 15 as secondary reflected light 14 by the secondary mirror 10. At this time, it is possible to obtain an image by imaging an image focused by the secondary mirror 10, by the CCD camera 16 through the lens 15.

Figure 2:
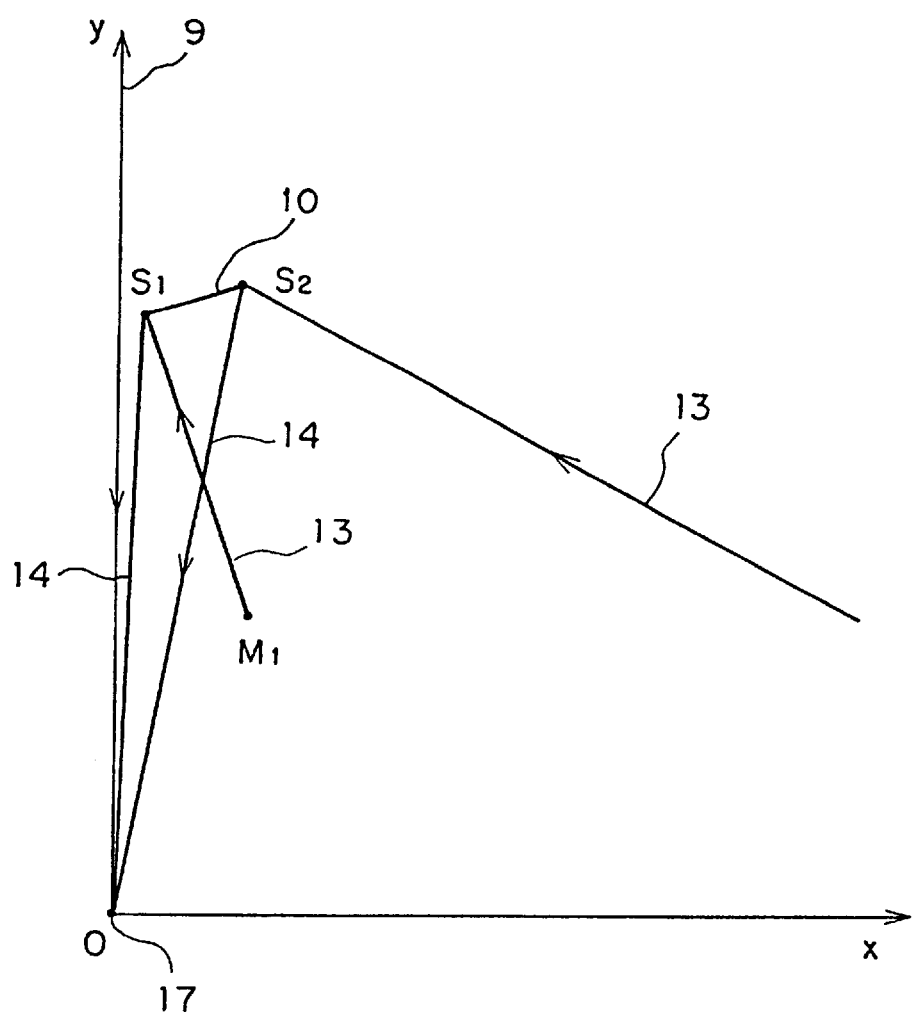
FIG. 2 is an explanatory view for explaining a designing method of a secondary mirror.
Figure 3:
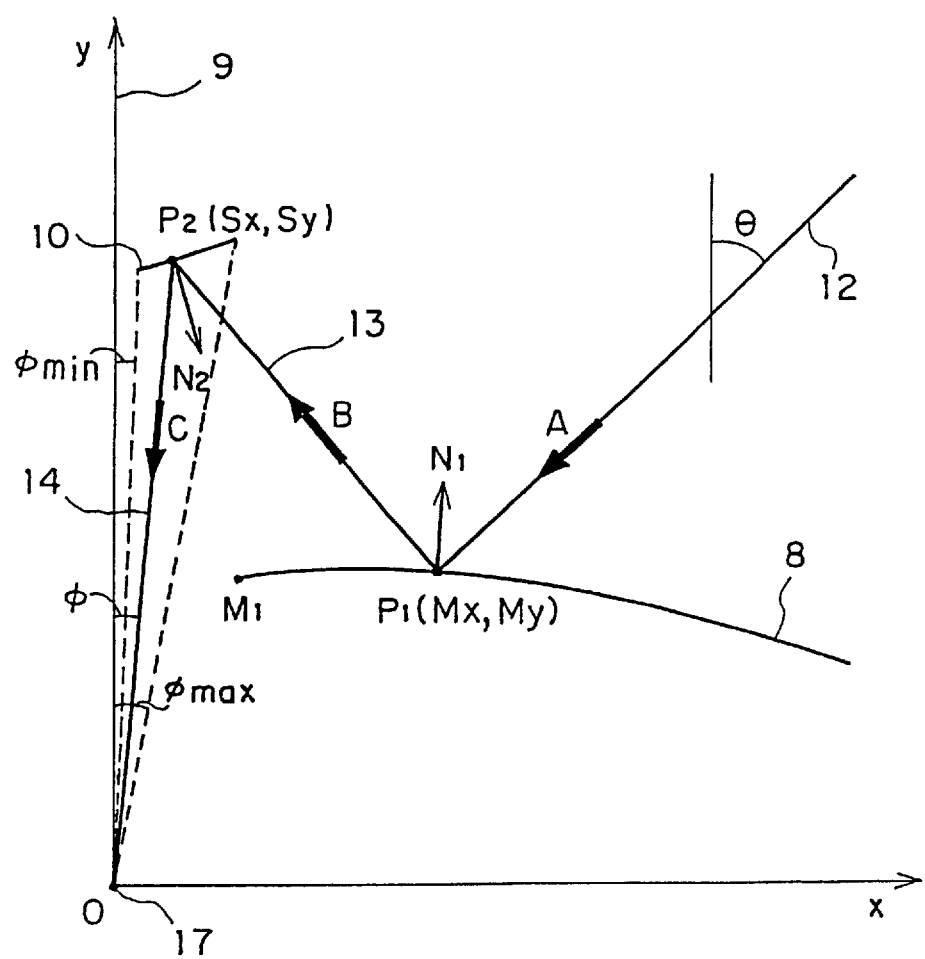
FIG. 3 is an explanatory view for explaining a designing method of a primary mirror.

Shape of the primary mirror 8 and the secondary mirror 10 can be designed as will be described below. Since the primary mirror 8 and the secondary mirror 10 are rotationally symmetric, the shape can be determined by determining each sectional shape. FIG. 2 is an explanatory view for explaining a designing method of the secondary mirror 10. In the drawing, reference numeral 17 means a view point, and the original of the co-ordinates of the view point 17 is defined as zero, and the transverse axis defines an x-axis and the ordinate axis defines a y-axis. The view point 17 is a position of the lens 15. In addition, $S_1$ means a point on an inner periphery of the secondary mirror 10, $S_2$ is a point on an outer periphery of the secondary mirror 10, and $M_1$ is a point on an inner periphery of the primary mirror 8. FIG. 3 is an explanatory view for explaining a designing method of a primary mirror 8. In the drawing, $P_1$ is a point on a reflecting surface of the primary mirror 8, $P_2$ is a point on a reflecting surface of the secondary mirror 10, 0 is an incident angle of the incident light 12 into the apparatus, and φ is an incident angle of the secondary reflected light 14 into the lens 15.

Here, the primary mirror 8 is designed by providing the following conditions:

Condition 1 "the sectional shape of the reflecting surface of the secondary mirror 10";

Condition 2 "a position of the point $M_1$ on the inner periphery of the primary mirror 8"; and Condition 3 "a relationship between the incident angle $\theta$ of the incident light 12 and the incident angle $\phi$ of the secondary reflected light 14 into the view point 17."

The Condition 1, that is, the sectional shape of the reflecting surface of the secondary mirror 10 is not arbitrarily set, but is set depending upon the Condition 2 and the direction of the primary reflected light 13 incident on the point $S_2$ on the outer periphery of the secondary mirror 10. The primary reflected light 13 is light which is reflected from points on the outer periphery of the primary mirror 8, and the point on the outer periphery of the primary mirror 8 exists on an optical path thereof. In FIG. 2, the reflecting surface of the secondary mirror 10 has such inclination at the point $S_1$ that the primary reflected light 13 coming from the point $M_1$ is reflected in a direction of the view point 17, and has such inclination at the point S2 that the primary reflected light 13 having the set inclination is reflected in the direction of the view point 17. In the reflecting surface of the secondary mirror 10, a shape, a position, and a size are set so as to meet the above conditions. Here, it is assumed that the above conditions can be met by the sectional shape of the reflecting surface of the secondary mirror 10, which is defined as $y=f_2(x)$.

The primary mirror 8 is designed according to the above conditions. In FIG. 3, the sectional shape of the primary mirror is expressed as $y=f_1(x)$. First, a description will now be given of reflection at the point $P_1$ ($M_x$, $M_y$) on the reflecting surface of the primary mirror 8. It is assumed that an A vector indicates a vector of the incident light 12 having a unit length, a B vector is a vector of the primary reflected light 13, and an $N_1$ vector is a normal vector. Thus, these components can be expressed as follows:

$$A=(-\sin\theta, -\cos\theta)$$
$$B=(S_x-M_x, S_y-M_y) \quad (1)$$
$$N_1=(-f_1'(M_x), 1)$$

where $f_1'(M_x)$ denotes the first order derivative in $f_1(x)$ at $x=M_x$.

By the law of reflection, the following relationship holds between these vectors:

$$\left(A+\frac{B}{|B|}, N_1\right)=0 \quad (2)$$

That is, $$\left(-\sin\theta+\frac{S_x-M_x}{\sqrt{(S_x-M_x)^2+(S_y-M_y)^2}}\right)(-f_1'(M_x)) + \left(-\cos\theta+\frac{S_y-M_x}{\sqrt{(S_x-M_x)^2+(S_y-M_y)^2}}\right)=0 \quad (3)$$

Next, a description will now be given of reflection at the point $P_2$ ($S_x$, $S_y$) on the reflecting surface of the secondary mirror 10. It is assumed that a C vector indicates a vector of the secondary reflected light 14, and an $N_2$ vector is a normal vector. Thus, these components can be expressed as follows:

$$C=(-S_x, -S_y)$$
$$N_2=(f_2'(S_x), -1) \quad (4)$$

where $f_2'(S_x)$ denotes the first order derivative in $f_2(x)$ at $x=S_x$. By the law of reflection, the following relationship holds between these vectors.

$$\left(\frac{B}{|B|}+\frac{C}{|C|}, N_2\right)=0 \quad (5)$$

That is, $$\left(\frac{S_x-M_x}{\sqrt{(S_x-M_x)^2+(S_y-M_y)^2}}+\frac{-S_x}{\sqrt{S_x^2+S_y^2}}\right)(f_2'(S_x)) + \left(\frac{S_y-M_y}{\sqrt{(S_x-M_x)^2+(S_y-M_y)^2}}+\frac{-S_y}{\sqrt{S_x^2+S_y^2}}\right)(-1)=0 \quad (6)$$

Further, since $P_2$ exists on the reflecting surface of the secondary mirror 10, the following expression holds:

$$S_y=f_2(S_x) \quad (7)$$

Here, if a distance between 0 and $P_2$ is defined as D, then $$S_x=D\sin\phi$$
$$S_y=D\cos\phi \quad (8)$$

When these expressions are substituted in the expressions (3), (6), and (7), the following expressions are obtained:

$$f_1'(M_x)=\frac{D\cos\phi-M_y-\sqrt{D^2-2(M_x\sin\phi+M_y\cos\phi)D+M_x^2+M_y^2}\cdot\cos\theta}{D\sin\phi-M_x-\sqrt{D^2-2(M_x\sin\phi+M_y\cos\phi)D+M_x^2+M_y^2}\cdot\sin\theta} \quad (9)$$

$$\left(\sin\phi-\frac{D\sin\phi-M_x}{\sqrt{D^2-2(M_x\sin\phi+M_y\cos\phi)D+M_x^2+M_y^2}}\right)(f_2'(D\sin\phi))+\left(\cos\phi-\frac{D\cos\phi-M_x}{\sqrt{D^2-2(M_x\sin\phi+M_y\cos\phi)D+M_x^2+M_y^2}}\right)(-1)=0 \quad (10)$$

$$D\cos\phi=f_2(D\sin\phi) \quad (11)$$

We defind the relationship between $\phi$ and $\theta$ is by:

$$\theta=g(\phi) \quad (12)$$

By using the expressions (10) and (11), $\phi$ is expressed as a function of the coordinates of $P_1$ on the reflecting surface of the primary mirror 8, and $\theta$ corresponding to $\phi$ is subsequently obtained by using the expression (12). Thus, it is possible to determine the coordinates of the reflecting surface, that is, the shape of the reflecting surface of the primary mirror 8 by substituting the values in the expression (9) and performing numerical integration from the point $M_1$.

When the expression (12) is defined for design as a function in which θ ranging from 0° to 90° corresponds to φ ranging from $\phi_{min}$ to $\phi_{max}$, a 180° angle of view (fish-eye) can be provided. Similarly, if defined as another function in which θ ranging from 0° to 120° corresponds to φ ranging from $\phi_{min}$ to $\phi_{max}$, it is also possible to design so as to provide a wider angle of view.

Figure 4:
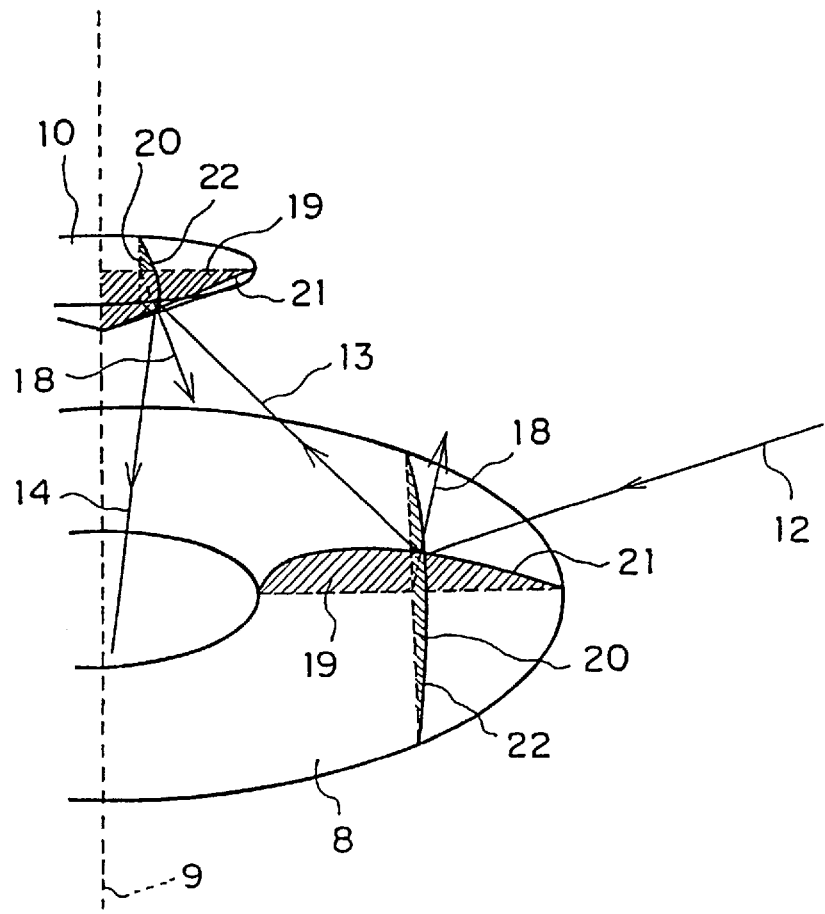
FIG. 4 is an explanatory view for explaining radial curvature and circumferential curvature of a mirror surface.
Figure 5:
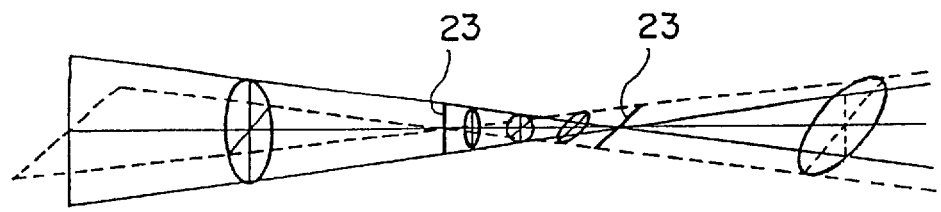
FIG. 5 is an explanatory view for explaining linear images.

Next, a description will now be given of a computing method of aberration in the reflection type angle of view transforming optical apparatus, that is, a method of computing linear images generated by the sectional curvature in a radial direction and in a circumferential direction of a mirror surface. FIG. 4 is an explanatory view for explaining radial curvature of the mirror surface and circumferential curvature of the mirror surface. In the drawing, reference numeral 18 means a normal of the mirror surface at a reflective point of light, 19 is the plane including the axis of rotational symmetry 9 and the incident light 12, 20 is a plane including the normal 18 and extending perpendicular to the plane 19, 21 is a curve where the plane 19 intersects the mirror surface, and 22 is a curve where the plane 20 intersects the mirror surface. Here, curvature of the curve 21 is the radial curvature of the mirror surface, and curvature of the curve 22 is the circumferential curvature of the mirror surface. FIG. 5 is an explanatory view for explaining linear images shown in "Telescopic Optics for Amateur of Astronomy/Reflection" Shotaro Yoshida, Seibundo Shinkosha, p.104, (1988). In the drawing, reference numeral 23 means the image having a linear form, that is, the linear image. In case of the apparatus, the radial curvature and the circumferential curvature of the mirror surface are different from one another, and an image distance (a distance between the mirror surface and the image) in the plane 19 is different from an image distance in the plane 20. Thereby, as shown in FIG. 5, two linear images 23 are generated. It is possible to evaluate astigmatism and curvature of an image surface by computing the positions of the two linear images.

Figure 6:
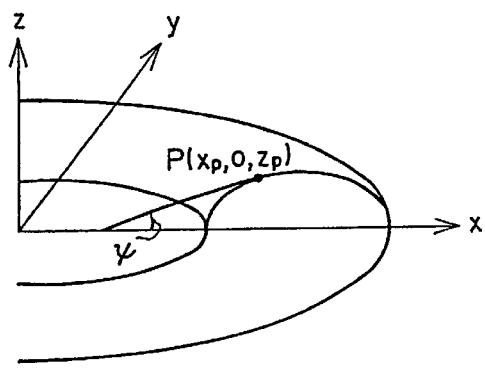
FIG. 6 is a view showing a body of rotation.

A description will now be given of a computing method of curvature of a rotationally symmetric surface. It is assumed that the surface as shown in FIG. 6 can be expressed as follows:

$$Z = f\left(\sqrt{X^2 + Y^2}\right) \tag{13}$$

At a point $P=(x_p, 0, z_p)$ on the surface, the curvature will be found. For this purpose, the following fact is utilized. That is, when a coordinate system (x, y, z) is rotated such that a tangent plane at the point P extends parallel to $(x_1, x_2)$ plane in new coordinate system $(x_1, x_2, X_3)$, the radial curvature is equal the second-order derivative of $x_1$ with respect to $X_3$ at the point P, and the circumferential curvature is equal to the second-order derivative of $x_2$ with respect to $X_3$. A radius of curvature is the reciprocal of curvature. When inclination of the tangent plane at the point P is defined as ψ, the following relation can be obtained.

$$\cos\psi = \frac{1}{\sqrt{1 + (f'(X_P))^2}} \tag{14}$$

$$\sin\psi = \frac{f'(X_p)}{\sqrt{1 + (f'(X_p))}} \tag{15}$$

$$\tan\psi = f'(X_p) \tag{16}$$

Figure 7:
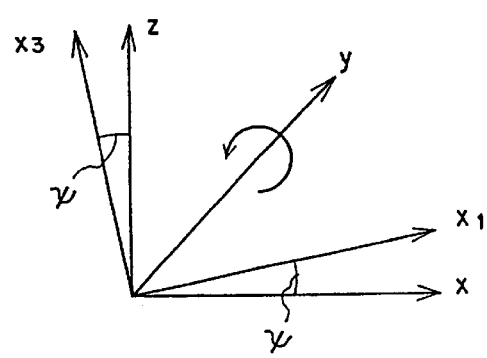
FIG. 7 is an explanatory view for explaining transformation of a coordinate system.

As shown in FIG. 7, x-axis, y-axis, and z-axis may be rotated about the y-axis by ψ in order to transform (x, y) plane into the $(x_1, x_2)$ plane extending parallel to the tangent plane at the point P. That is, $$\begin{bmatrix} x \\ y \\ z \end{bmatrix} = \begin{bmatrix} \cos\psi & 0 & -\sin\psi \\ 0 & 1 & 0 \\ \sin\psi & 0 & \cos\psi \end{bmatrix} \begin{bmatrix} x_1 \\ x_2 \\ x_3 \end{bmatrix} \tag{17}$$

When this expression is substituted in the expression (13), and the second order differentiation of $X_3$ is performed by $x_1$, $$\frac{\partial^2 X_1}{\partial x_1^2} = \frac{1}{\left\{\cos\psi\sqrt{x^2+y^2} + f'\left(\sqrt{x^2+y^2}\right)x\sin\psi\right\}^2} \times \tag{18}$$

$$\left\{\left[-\sin\psi\frac{x}{\sqrt{x^2+y^2}} + f''\left(\sqrt{x^2+y^2}\right)\frac{x}{\sqrt{x^2+y^2}}x\cos\psi + f'\left(\sqrt{x^2+y^2}\right)\cos\psi\right]\frac{\partial x}{\partial x_1} \times \left[-\cos\psi\sqrt{x^2+y^2} + f'\left(\sqrt{x^2+y^2}\right)x\sin\psi\right] - \left[\cos\psi\frac{x}{\sqrt{x^2+y^2}} + f''\left(\sqrt{x^2+y^2}\right)\frac{x}{\sqrt{x^2+y^2}}x\sin\psi + f'\left(\sqrt{x^2+y^2}\right)\sin\psi\right]\frac{\partial x}{\partial x_1} \times \left[-\sin\psi\sqrt{x^2+y^2} + f'\left(\sqrt{x^2+y^2}\right)x\cos\psi\right]\right\}$$

At the point P, $x=x_p$, $y=0$, and the expression (17) can lead the following expression:

$$\frac{\partial x}{\partial x_1} = \cos\psi \tag{19}$$

Therefore, $$\frac{\partial^2 x_3}{\partial x_1^2} = \frac{f''(x_p)\cos\psi}{1 + f(x_p)\tan\psi} \tag{20}$$

When the expressions (14) and (16) are substituted in the expression (20), the following expression can be obtained:

$$\frac{\partial^2 x_3}{\partial x_1^2} = \frac{f''(x_p)}{(1+(f'(x_p))^2)^{\frac{3}{2}}} \quad (21)$$

This is the radial curvature. Since the reciprocal thereof is equal to the radius of curvature $r_r$ in the radial direction, $$r_r = \frac{(1+(f'(x_p))^2)^{\frac{3}{2}}}{f''(x_p)} \quad (22)$$

Similarly, when the expression (17) is substituted in the expression (13), and the second order differentiation of $X_3$ is performed by $x_1$,
By the expression (17), $$\frac{\partial x}{\partial x_2} = 0 \quad (24)$$

$$\frac{\partial y}{\partial x_2} = 1 \quad (25)$$

$$\frac{\partial^2 x_3}{\partial x_2^2} = \frac{1}{\left[\cos\psi\sqrt{x^2+y^2} + f'\left(\sqrt{x^2+y^2}\right)x\sin\psi\right]^2} \times$$

$$\left\{\left[f'\left(\sqrt{x^2+y^2}\right)\frac{x}{\sqrt{x^2+y^2}}\frac{\partial x}{\partial x_2} + f'\left(\sqrt{x^2+y^2}\right)\frac{\partial y}{\partial x_2}\right] \times \right.$$

$$\left[\cos\psi\sqrt{x^2+y^2} + f'\left(\sqrt{x^2+y^2}\right)x\sin\psi\right] - f'\left(\sqrt{x^2+y^2}\right)y \times$$

$$\left[\cos\psi\frac{x}{\sqrt{x^2+y^2}} + \right.$$

$$\left.f''\left(\sqrt{x^2+y^2}\right)\frac{x}{\sqrt{x^2+y^2}}x\sin\psi + f'\left(\sqrt{x^2+y^2}\right)\sin\psi\right]\frac{\partial x}{\partial x_2}\right\} \quad (23)$$

Consequently, by using the expression (14) as in the above case, $$\frac{\partial^2 x_3}{\partial x_2^2} = \frac{f'(x_p)}{x_p\sqrt{1+(f'(x_p))^2}} \quad (26)$$

This is the circumferential curvature. Since the reciprocal thereof is equal to the radius of curvature $r_c$ in the circumferential direction, $$r_c = \frac{x_p\sqrt{1+(f'(x_p))^2}}{f'(x_p)} \quad (27)$$

Figure 8:
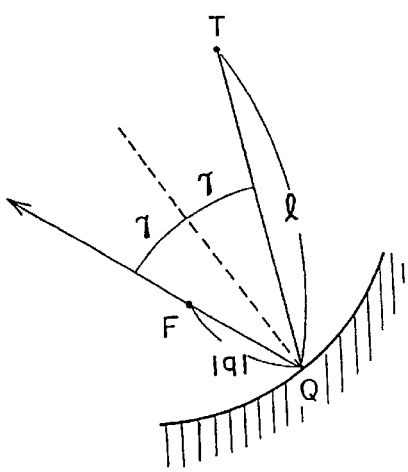
FIG. 8 is an explanatory view for explaining an image distance.
Figure 8:
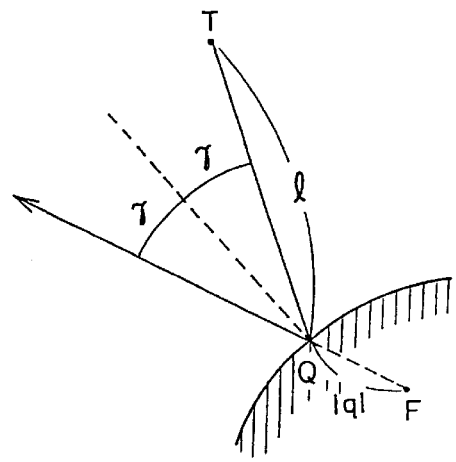

Next, a description will now be given of a computing method of the image distance. FIGS. 8(A), (B) are explanatory views for explaining the image distance. FIG. 8(A) shows a case where the mirror surface is concave, and FIG. 8(B) shows a case where the mirror surface is convex. In the drawings, T means a position of an object to be observed, Q is a reflective point, F is a position of a formed image, q is an image distance from the reflective point Q to the position F of the image, and l is a distance from the object T to the reflective point Q.

Here, a curved surface (shown as a curve) of the mirror is defined as follows:

$$Q_y = f(Q_x) \quad (28)$$

and, a first order derivative and a second order derivative at $Q_x$ are expressed as follows:

$$\alpha = f'(Q_x) \quad (29)$$

$$\beta = f''(Q_x) \quad (30)$$

In this case, a tangent vector, a normal vector, curvature, a radius of curvature can respectively be expressed as follows:

When inclination of reflected light is defined as k, an expression of a reflected light beam can be written as follows:

$$y - Q_y = k(x - Q_x) \quad (35)$$

$$v = \frac{1}{\sqrt{1+\alpha^2}}(1, \alpha) \quad (31)$$

$$n = \frac{1}{\sqrt{1+\alpha^2}}(-\alpha, 1) \quad (32)$$

$$\kappa = -\frac{\beta}{(1+\alpha^2)^{\frac{3}{2}}} \quad (33)$$

$$r = \frac{1}{\kappa} = -\frac{(1+\alpha^2)^{\frac{3}{2}}}{\beta} \quad (34)$$

Since the formed image $F=(F_x, F_y)$ exists on the straight line, the following expression holds:

$$F_y + Q_y = k(F_x - Q_x) \quad (36)$$

Further, the position of the formed image F is not varied even if the incident light is moved by a slight amount. Thus, when the expression (36) is differentiated by $Q_x$, $$-\left(\frac{dQ_y}{dQ_x}\right) = \frac{dk}{dQ_y}(F_x - Q_x) - k \quad (37)$$

That is, $$F_x - Q_x = \frac{k - \alpha}{\frac{dk}{dQ_x}} \quad (38)$$

When this expression is substituted in the expression (33), $$F_y - Q_y = \frac{k(k-\alpha)}{\frac{dk}{dQ_x}} \quad (39)$$

Accordingly, if the reflective point is defined as $Q-(Q_x, Q_y)$, the image distance q can be obtained by the following expression:

$$q = |F - Q| \quad (40)$$

$$= \frac{|k - \alpha|\sqrt{1+k^2}}{\left|\frac{dk}{dQ_x}\right|}$$

Meanwhile, a vector in a direction of the reflected light can be obtained by simply rotating a vector $(-\alpha, 1)$ in a direction of the normal by $\gamma$. That is, $$\begin{pmatrix} \cos\gamma & -\sin\gamma \\ \sin\gamma & \cos\gamma \end{pmatrix} \begin{pmatrix} -\alpha \\ 1 \end{pmatrix} = \begin{pmatrix} -(\alpha\cos\gamma + \sin\gamma) \\ -(\alpha\sin\gamma - \cos\gamma) \end{pmatrix} \quad (41)$$

This leads the inclination k as follows:

$$k = \frac{\alpha\sin\gamma - \cos\gamma}{\sin\gamma + \alpha\cos\gamma} \quad (42)$$

Further, $$k - \alpha = -(1 + \alpha^2) \frac{\cos\gamma}{\sin\gamma + \alpha\cos\gamma} \quad (43)$$

$$\sqrt{1 + k^2} = \sqrt{1 + \alpha^2} \; \frac{1}{\sin\gamma + \alpha\sin\gamma} \quad (44)$$

In order to differentiate k of the expression (42) by $Q_x$, it is necessary to regard $\alpha$ and $\gamma$ as a function of $Q_x$. With respect to $\alpha$, the definition leads to the following expression:

$$\frac{d}{dQ_x} \alpha = f''(Q_x) = \beta \quad (45)$$

Subsequently, the vector from the reflective point Q to the object T is defined as an L vector so as to obtain an expression in relation to $\gamma$.

$$L = (L_x, L_y) = T - Q \quad (46)$$

Then, projections in a tangent direction of the L vector are respectively expressed as follows:

When the expressions (47) and (48) are substituted in $$l\sin\gamma = (L, v) = \frac{1}{\sqrt{1 + \alpha^2}} (L_x + \alpha L_y) \quad (47)$$

$$l\cos\gamma = (L, n) = \frac{1}{\sqrt{1 + \alpha^2}} (-\alpha L_x + L_y) \quad (48)$$

the expression (42), the following expression can be obtained:

$$k = \frac{2\alpha L_x - (1 - \alpha^2) L_y}{(1 - \alpha^2) L_x + 2\alpha L_y} \quad (49)$$

Differentiation of $L_x$, $L_y$ by $Q_x$ can be written by the definition of the expression (46) as follows:

$$\frac{dL_x}{dQ_x} = -1 \quad (50)$$

$$\frac{dL_y}{dQ_x} = -\frac{dQ_y}{dQ_x} = -\alpha \quad (51)$$

When the expressions (50) and (51) are used to differentiate the expression (49) by $Q_x$, $$\frac{dk}{dQ_x} = -(1 + \alpha^2)^{\frac{3}{2}} \frac{2\kappa l + \cos\gamma}{l(\sin\gamma + \alpha\cos\gamma)^2} \quad (52)$$

Further, when the expressions (43), (44), and (52) are substituted in the expression (40), the following expression can be obtained:

$$q = \frac{l\cos\gamma}{2\kappa l + \cos\gamma} \quad (53)$$

$$= \frac{l\cos\gamma}{2l/\gamma + \cos\gamma}$$

This is the image distance q from the reflective point Q of the light beam to the image position F. In case of the convex mirror, for q>0, the image is formed in a back side of the mirror, and in case of the convex mirror, for q<0, the image is formed in front of the mirror. It is to be understood that r, $\kappa$>0 in case of the convex mirror, r, $\kappa$<0 in case of the concave mirror, and r, $\kappa$=0 in case of a plane mirror.

Figure 9:
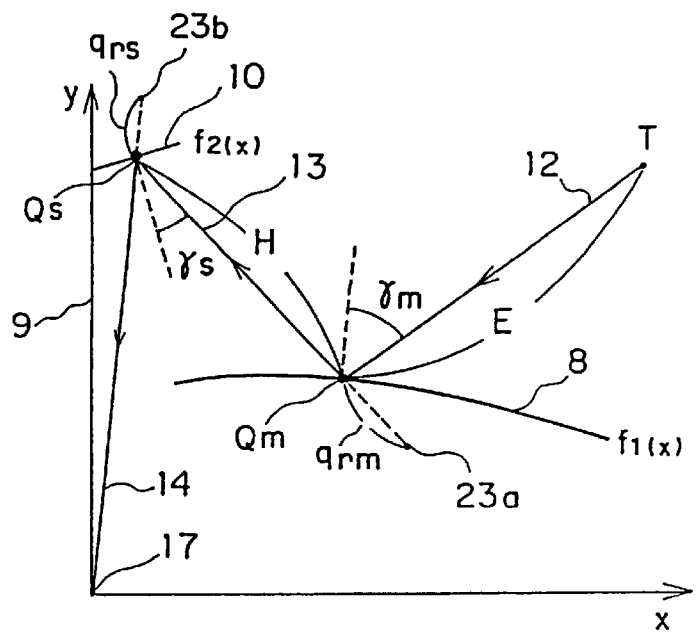
FIG. 9 is a view showing a position of a linear image generated by the radial curvature of the mirror surface.

Finally, a description will be given of a computing method of positions of the linear images 23 respectively generated by the radial curvature and the circumferential curvature of the mirror surface by using the computing method of the curvature of the rotation body surface and using the computing method of the image distance. FIG. 9 is a view showing the position of the linear image 23 generated by the radial curvature of the mirror surface. In the drawing, reference numeral 23a means a linear image generated by the curvature of the primary mirror 8, 23b is a linear image generated by the curvature of the secondary mirror 10, $Q_m$ is a reflective point of the primary mirror, $Q_s$ is a reflective point of the secondary mirror, $q_{rm}$ is an image distance from the reflective point $Q_m$ to the linear image 23a, $q_{rs}$ is a distance from the reflective point $Q_s$ to the linear image 23b, $\gamma_m$ is an incident angle of the incident light 12 into the primary mirror 8 in the radial direction, $\gamma_s$ is an incident angle of the primary reflected light 13 into the secondary mirror 10 in the radial direction, E is a distance from a position T of the object to be observed to the reflective point $Q_m$, and H is a distance from the reflective point $Q_m$ to the reflective point $Q_s$. First, the position of the linear image 23 generated by the radial curvature of the mirror surface is found. The expression (22) can lead a radius of curvature $r_{rm}$ in the radial direction of the mirror surface of the primary mirror 8 as follows:

$$r_{rm} = -\frac{(1 + f'_1(x)^2)^{\frac{3}{2}}}{f''_1(x)} \quad (54)$$

Consequently, the image distance $q_{rm}$ can be found by the expression (53):

Next, the incident light into the secondary mirror 10

$$q_{rm} = \frac{E\cos\gamma}{2E/r_{rm} + \cos\gamma} \quad (55)$$

can be considered as light emitted from a light source spaced by a distance of (H+$q_{rm}$). Therefore, a radius of curvature $r_{rs}$ in a radial direction of the secondary mirror 10 can be written by the expression (22) as follows:

$$r_{rs} = \frac{(1 + f'_2(x)^2)^{\frac{3}{2}}}{f''_2(x)} \quad (56)$$

Thus, the image distance $q_{rs}$ can be derived from the expression (53) as follows:

$$q_{rs} = \frac{(H + q_{rm})\cos\gamma}{2(H + q_{rm})/r_{rs} + \cos\gamma} \quad (57)$$

Figure 10:
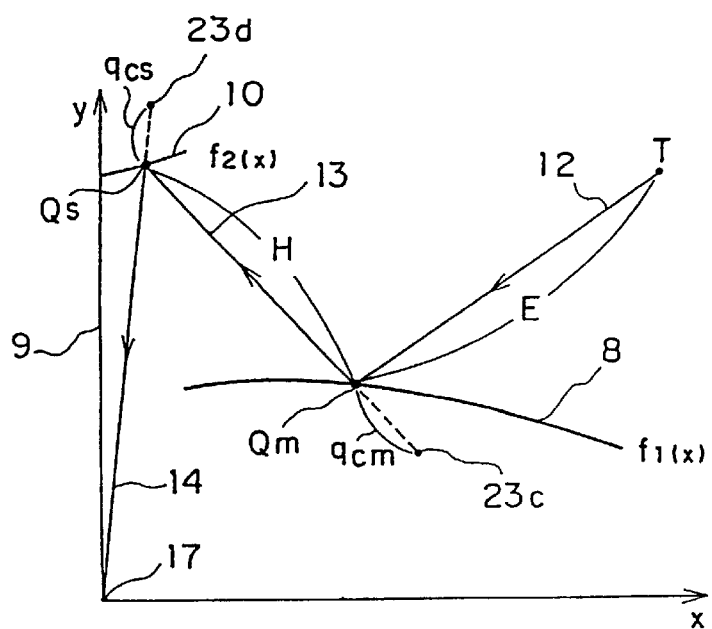
FIG. 10 is a view showing a position of a linear image generated by the circumferential curvature of the mirror surface.

Similarly, it is possible to find the position of the linear image 23 generated by the circumferential curvature of the mirror surface. FIG. 10 is an explanatory view for explaining a computing method of the position of the linear image 23 generated by the circumferential curvature of the mirror surface. In the drawing, reference numeral 23c means a linear image generated by the curvature of the primary mirror 8, 23d is a linear image generated by the curvature of the secondary mirror 10, $q_{cm}$ is an image distance from the reflective point $Q_m$ to the linear image 23c, and $q_{cs}$ is a distance from the reflective point $Q_s$ to the linear image 23d. A light beam can not be reflected in an observing direction unless the light beam enters in a direction perpendicular to the circumferential direction. Therefore, the incident angle of the light beam to the primary mirror/the secondary mirror is zero. A radius of curvature $r_{cm}$ in the circumferential direction of the mirror surface of the primary mirror 8 can be derived from the expression (27) as follows:

$$r_{cm} = \frac{x\sqrt{1 + (f'_1(x))^2}}{f'_1(x)} \tag{58}$$

Consequently, the image distance $q_{cm}$ can be derived from the expression (53) as follows:

$$q_{cm} = \frac{E}{2E/r_{cm} + 1} \tag{59}$$

Next, the incident light into the secondary mirror 10 can be considered as light emitted from a light source spaced by a distance of $(H+q_{cm})$. Therefore, a radius of curvature $r_{cs}$ in a circumferential direction of the secondary mirror 10 can be derived from the expression (27) as follows:

$$r_{cs} = \frac{x\sqrt{1 + (f'_2(x))^2}}{f'_2(x)} \tag{60}$$

Therefore, the image distance $q_{cs}$ can be derived from the expression (53) as follows:

$$q_{cs} = \frac{H + q_{cm}}{2(H + q_{cm})/r_{cs} + 1} \tag{61}$$

Embodiment 2

Figure 11:
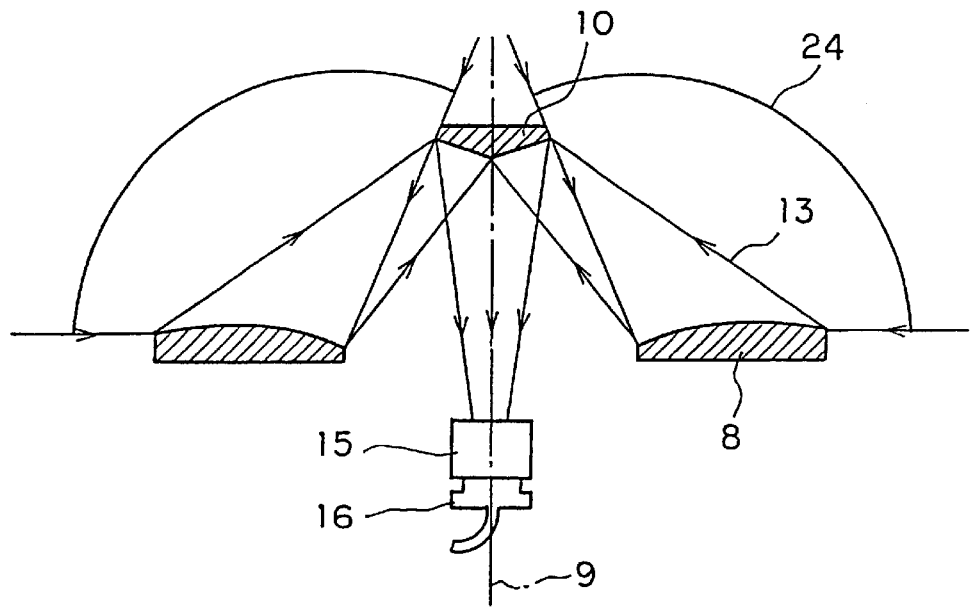
FIG. 11 is a structural view, partly in section, showing one embodiment of the reflection type angle of view transforming optical apparatus of the present invention.

FIG. 11 is a structural view, partly in section, showing one embodiment of a reflection type angle of view transforming optical apparatus of the present invention. In the drawing, reference numeral 24 means a field of view of a lens 15. It is possible to put a back side of a secondary mirror 10 in the field of view by defining the expression (12) for design as a function in which θ ranging from −10° to 90° corresponds to φ ranging from $\phi_{min}$ to $\phi_{max}$ in the embodiment 1.

Embodiment 3

Figure 12:
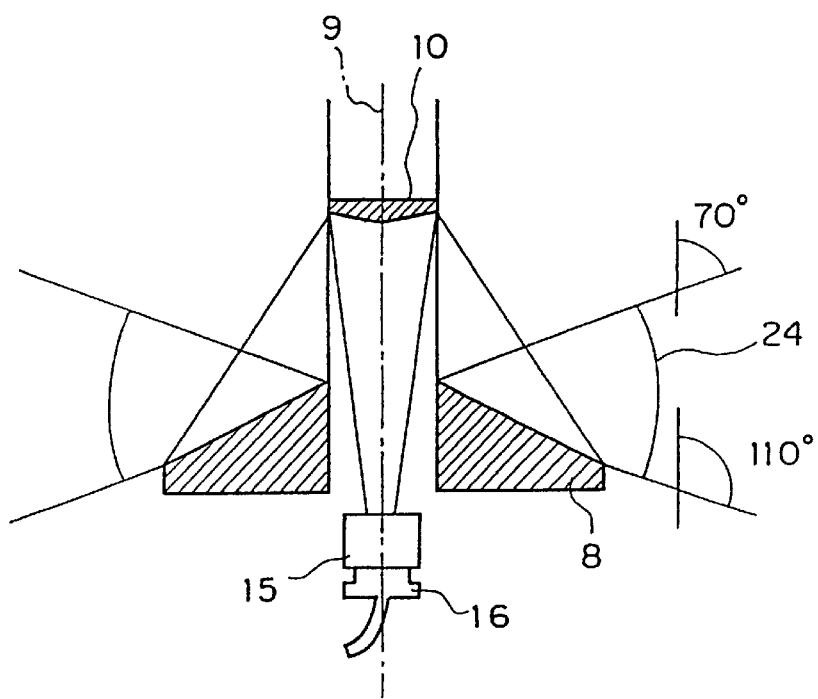
FIG. 12 is an explanatory view for explaining a designing method of one embodiment of the reflection type angle of view transforming optical apparatus of the present invention.

FIG. 12 is a structural view, partly in section, showing one embodiment of a reflection type angle of view transforming optical apparatus of the present invention. It is possible to get panoramic view by defining the expression (12) for design as a function in which θ ranging from 70° to 110° corresponds to φ ranging from $\phi_{min}$ to $\phi_{max}$ in the embodiment 1.

Embodiment 4

Figure 13:
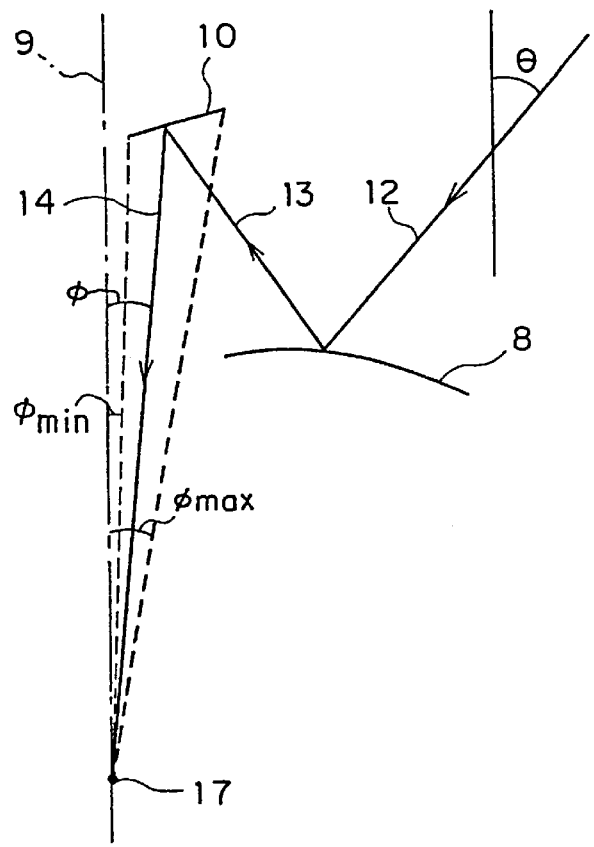
FIG. 13 is an explanatory view for explaining a designing method of one embodiment of the reflection type angle of view transforming optical apparatus of the present invention.

FIG. 13 is an explanatory view for explaining a designing method of one embodiment of the reflection type angle of view transforming optical apparatus of the present invention. In the embodiment, a projection mode is changed to equidistant projection by defining the expression (12) in the embodiment 1 as the following expression:

$$\theta = \frac{\theta_{max} - \theta_{min}}{\tan\phi_{max} - \tan\phi_{min}} (\tan\phi - \tan\phi_{min}) + \theta_{min} \tag{62}$$

As set forth above, it is possible to provide an equidistant projection image equally spaced with respect to an angle e of incident light 12. Therefore, accurate and effective observation can be made to, for example, observe a position of a star in astronomic observation.

Embodiment 5

Alternatively, a projection mode may be changed to equidistant solid angle projection by defining the expression (12) in the embodiment 1 as the following expression:

$$\theta = \cos^{-1}\left(\frac{\cos\theta_{min} - \cos\theta_{max}}{\tan^2\phi_{max} - \tan^2\phi_{min}} (\tan^2\phi_{max} - \tan^2\phi) + \cos\theta_{max}\right) \tag{63}$$

As set forth above, it is possible to provide an equidistant solid angle projection image which is projected in an area proportional to a solid angle of incident light 12. Therefore, accurate observation can be made to, for example, observe luminosity of stars in astronomic observation. Further, it is possible to observe a cloud amount or the like in an area ratio.

Embodiment 6

Alternatively, a projection mode may be changed to orthogonal projection by defining the expression (12) in the embodiment 1 as the following expression:

$$\theta = \sin^{-1}\left(\frac{\sin\theta_{max} - \sin\theta_{min}}{\tan\phi_{max} - \tan\phi_{min}} (\tan\phi - \tan\phi_{min}) + \sin\theta_{min}\right) \tag{64}$$

Embodiment 7

Alternatively, projection mode may be changed to stereographic projection by defining the expression (12) in the embodiment 1 as the following expression:

$$\theta = 2\tan^{-1}\left(\frac{\tan(\theta_{max}/2) - \tan(\theta_{min}/2)}{\tan\phi_{max} - \tan\phi_{min}} \times \tan\phi\right) \tag{65}$$

Embodiment 8

Figure 14:
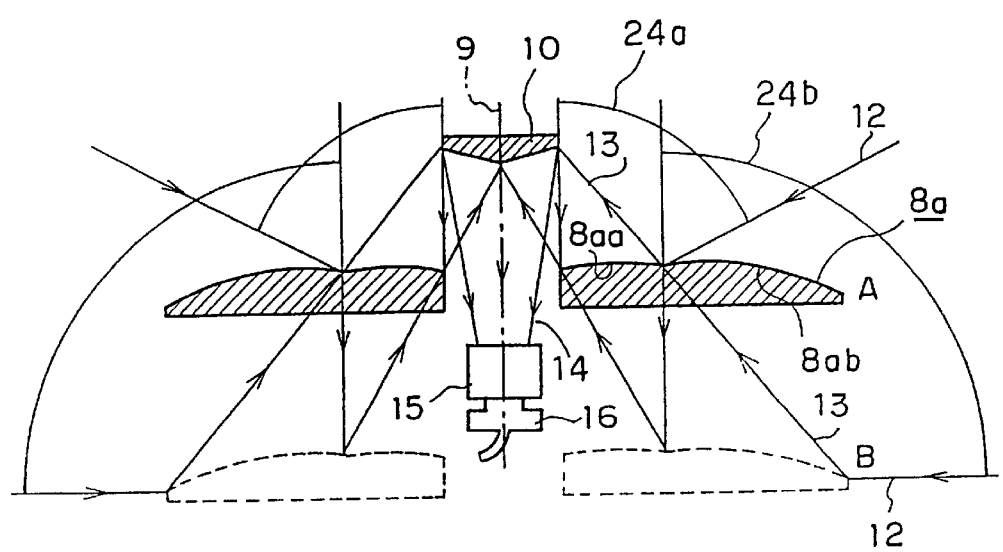
FIG. 14 is a structural view, partly in section, showing one embodiment of the reflection type angle of view transforming optical apparatus of the present invention.

FIG. 14 is a structural view, partly in section, showing one embodiment of a reflection type angle of view transforming optical apparatus of the present invention. In the drawing, reference numeral 8a means a primary mirror. The primary mirror 8a has a rotationally symmetric form, and includes partial mirrors 8aa, 8ab concentrically disposed to have each different angle of view. The primary mirror 8a is supported slidably in a direction of an axis of rotational symmetry 9 by a supporting/movable member (not shown) to pass incident light. The primary mirror 8a can be fixed at an illustrated position A or B. Reference numeral 24a means a field of view obtained by reflection of the partial mirror 8aa when the primary mirror 8a is positioned at the position A, and 24b is a field of view obtained by reflection of the partial mirror 8ab when the primary mirror 8a is positioned at the position B. Thus, a CCD camera 16 can image an image formed by the reflection of the partial mirror 8aa when the primary mirror 8a is positioned at the position A, and can image an image formed by the reflection of the partial mirror 8ab when the primary mirror 8a is positioned at the position B, resulting in providing the image by using two kinds of angles of view. Alternatively, the primary mirror 8a may include three or more partial mirrors. In this case, it is possible to provide angles of view whose kinds correspond to the number of the partial mirrors.

Embodiment 9

Figure 15:
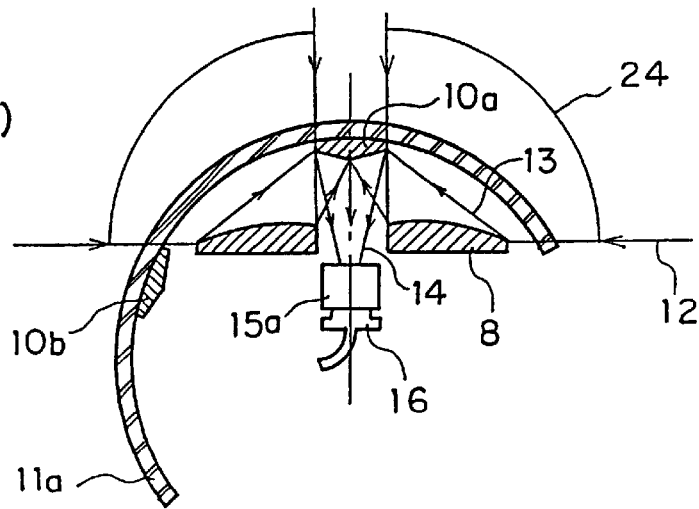
FIG. 15 is a structural view, partly in section, showing one embodiment of the reflection type angle of view transforming optical apparatus of the present invention.
Figure 15:
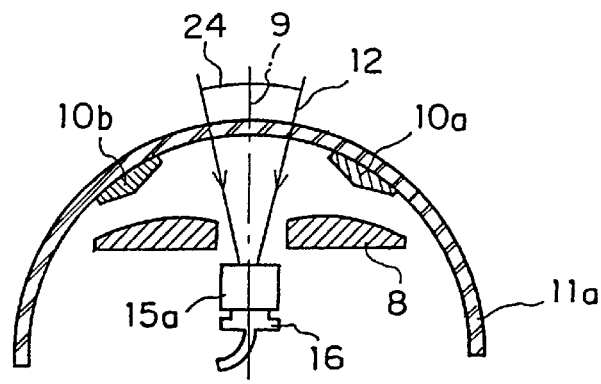
Figure 15:
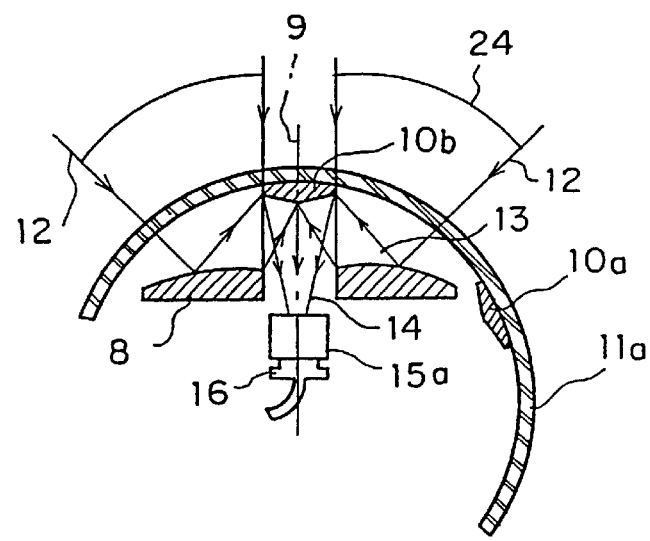

FIGS. 15(A), (B), and (C) are structural views, partly in section, showing one embodiment of a reflection type angle of view transforming optical apparatus of the present invention. In the drawing, reference numerals 10a, 10b respectively mean secondary mirrors having reflecting surfaces provided in rotationally symmetric forms. The secondary mirrors 10a, 10b are supported rotatably about an axis of rotation (not shown) extending perpendicular to an axis of rotational symmetry 9 of a primary mirror 8 by a supporting/rotatable member 11a to pass incident light from an object. It is possible to selectively combine any one of the two secondary mirrors 10a and 10b with the primary mirror 8 by rotating the supporting/rotatable member 11a so as to conform an axis of rotational symmetry of the secondary mirror 10a or 10b to the axis of rotational symmetry 9 of the primary mirror 8. Further, the reflecting surfaces of the secondary mirrors 10a, 10b have each different form. In addition, a telephoto lens 15a is mounted to a CCD camera 16. This apparatus can observe in a wide field of view 24 by using the secondary mirror 10a in a state of FIG. 15(A), and can observe an image enlarged by only the telephoto lens 15a by rotating the supporting/rotatable member 11a independent of the primary mirror 8 and the secondary mirror 10 in a state of FIG. 15(B). Further, it is possible to observe in a field of view (which is different from a field of view using the secondary mirror 10a) 24 using the secondary mirror 10b by rotating the supporting/rotatable member 11a. That is, the supporting/rotatable member 11a can be operated to select three angles of view. Alternatively, four or more angles of view may be provided by using three or more secondary mirrors. Further, it must be noted that the same effect can be obtained by attaching a plurality of primary mirrors to the supporting/rotatable member instead of providing the plurality of secondary mirrors.

Embodiment 10

Figure 16:
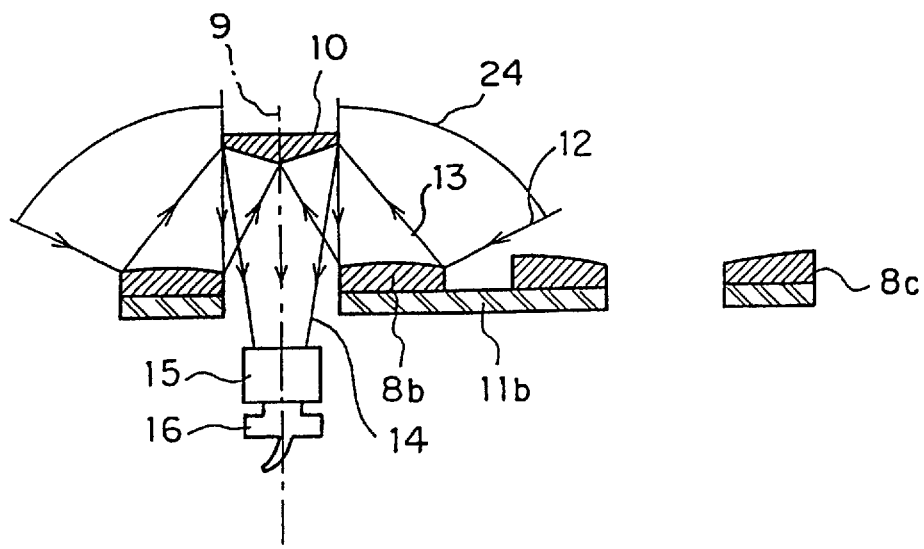
FIG. 16 is a structural view, partly in section, showing one embodiment of the reflection type angle of view transforming optical apparatus of the present invention.
Figure 16:
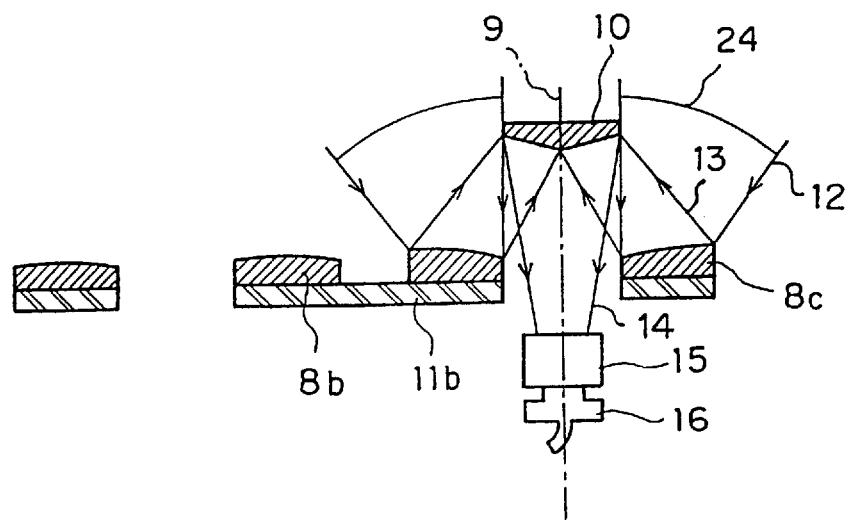

FIGS. 16(A), (B) are structural views, partly in section, showing one embodiment of a reflection type angle of view transforming optical apparatus of the present invention. In the drawing, reference numerals 8b, 8c respectively mean primary mirrors having reflecting surfaces provided in rotationally symmetric forms. The primary mirrors 8b, 8c are supported slidably in a direction perpendicular to an axis of rotational symmetry 9 by a supporting/movable member 11b. It is possible to selectively position any one of the primary mirrors 8b and 8c at a position opposed to a secondary mirror 10 so as to conform an axis of rotational symmetry of the primary mirror 8b or 8c to the axis of rotational symmetry 9 of the secondary mirror. Further, the reflecting surfaces of the primary mirrors 8b, 8c have each different form. This apparatus can observe in a wide field of view 24 by using the primary mirror 8b in a state of FIG. 16(A), and can observe in a field of view (which is different from a field of view using the primary mirror 8b) 24 using the primary mirror 8c in a state of FIG. 16(B), in which the primary 56 mirrors are changed by sliding the supporting/movable member 11b. That is, it is possible to select two kinds of angles of view. Alternatively, three or more angles of view may be provided by using three or more primary mirrors. Further, it must be noted that the same effect can be obtained by attaching a plurality of secondary mirrors to the supporting/movable member instead of providing the plurality of primary mirrors.

Embodiment 11

Figure 17:
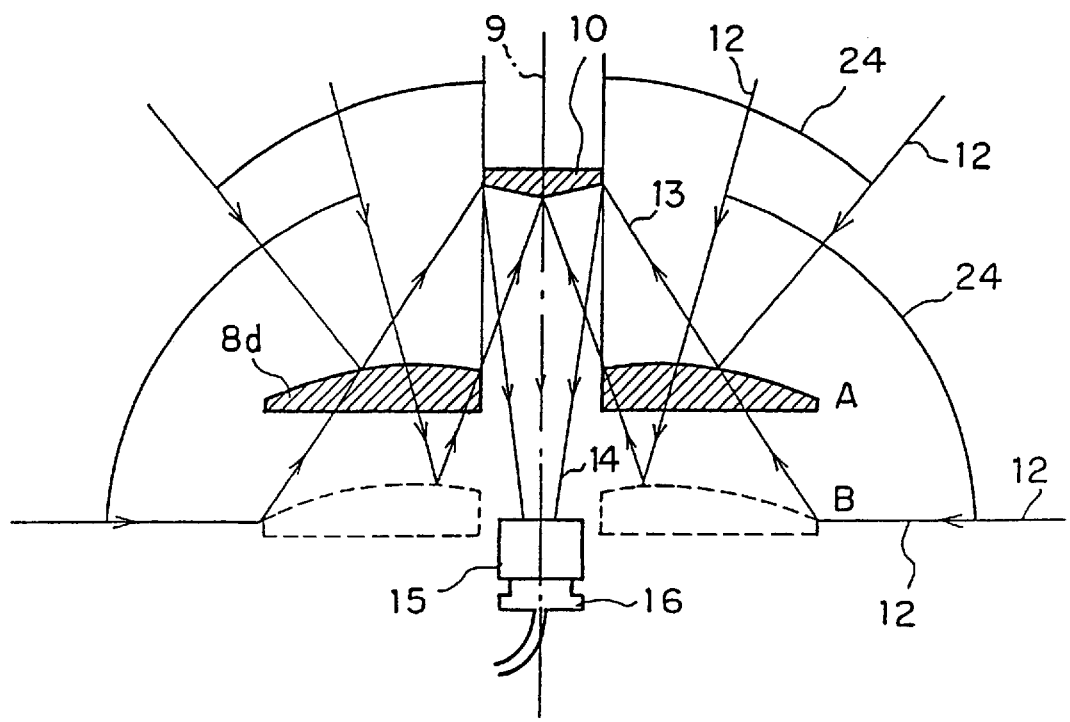
FIG. 17 is a structural view, partly in section, showing one embodiment of the reflection type angle of view transforming optical apparatus of the present invention.

FIG. 17 is a structural view, partly in section, showing one embodiment of a reflection type angle of view transforming optical apparatus of the present invention. In the drawing, reference numeral 8d means a primary mirror. The primary mirror 8d is supported slidably in a direction of an axis of rotational symmetry 9 by a supporting/movable member (not shown). Further, a reflecting surface of the primary mirror 8d is formed such that a relationship between incident light 12 and secondary reflected light 14 can be varied according to an interval between the slid primary mirror 8d and the secondary mirror 10. Thus, since the primary mirror 8d can be fixed at a desired position between A and B, a field of view 24 of a CCD camera 16 can be successively varied by movement of the primary mirror 8d.

Embodiment 12

Figure 18:
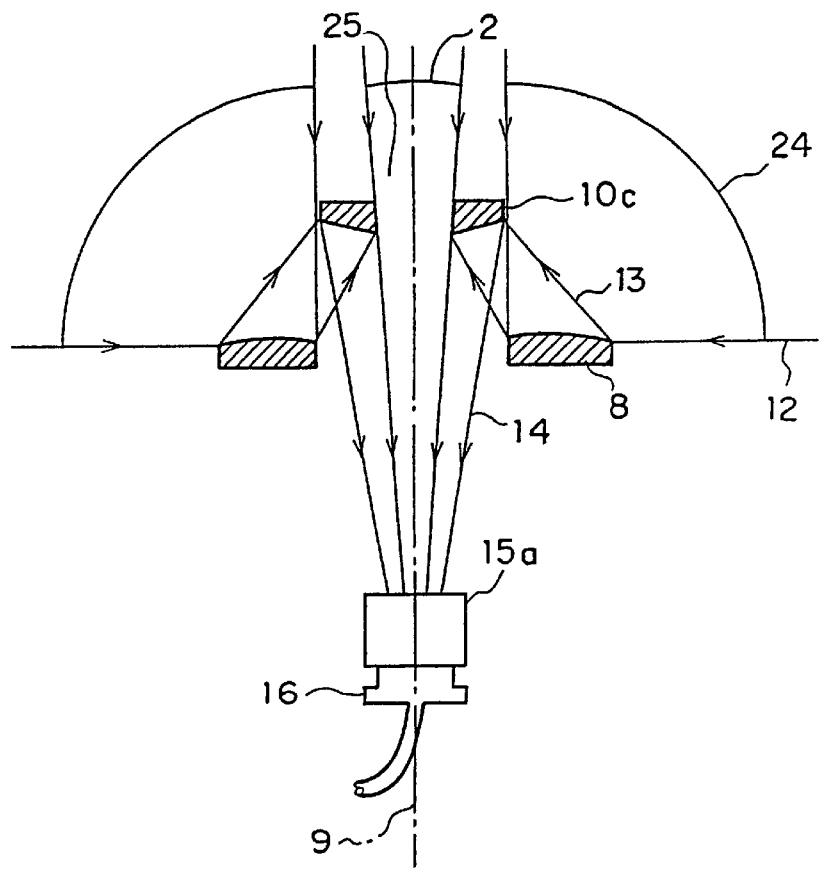
FIG. 18 is a structural view, partly in section, showing a reflection type angle of view transforming optical apparatus of the present invention.
Figure 19:
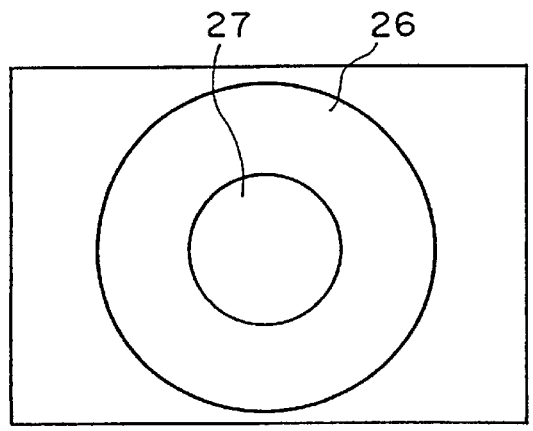
FIG. 19 is a plan view showing an image obtained by the apparatus of FIG. 18.

FIG. 18 is a structural view, partly in section, showing a reflection type angle of view transforming optical apparatus of the present invention. In the drawing, reference numeral 10c means a secondary mirror, and the secondary mirror 10c has a transmitting portion 25 to transmit incident light 12. Further, reference numeral 15a means a telephoto lens. FIG. 19 shows an image obtained by the apparatus in the embodiment. In the drawing, reference numeral 26 means an image formed by secondary reflected light 14 which is reflected from the secondary mirror 10c, and 27 is an image formed by the incident light 12 directly passing through the transmitting portion 25 of the secondary mirror 10c. In this way, it is possible to concurrently observe a wide angle image and a direct enlarged image by mounting the telephoto lens 15a to a CCD camera 16.

Embodiment 13

Figure 20:
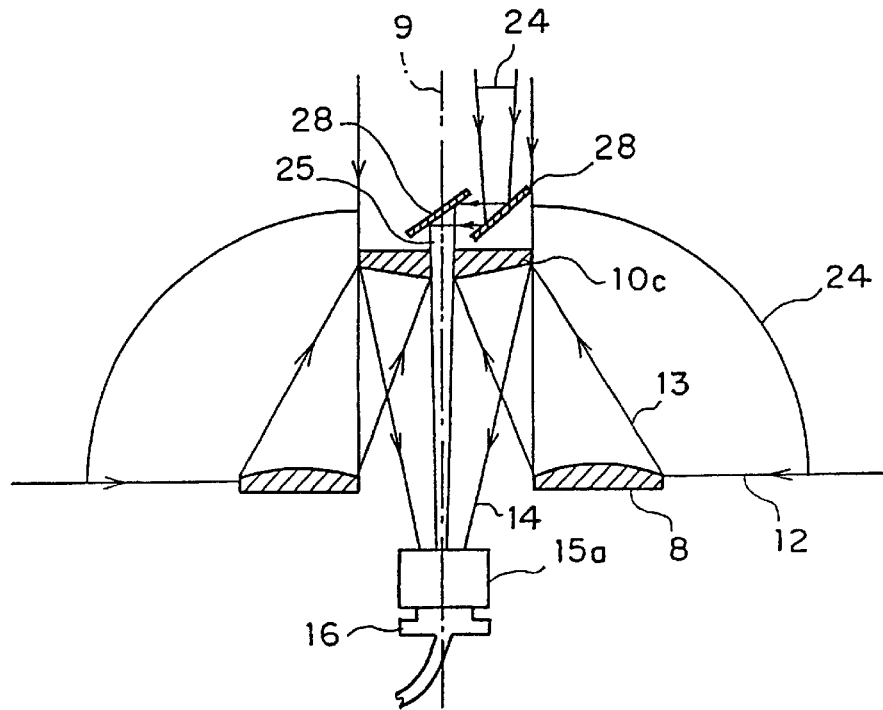
FIG. 20 is a structural view, partly in section, showing one embodiment of the reflection type angle of view transforming optical apparatus of the present invention.
Figure 20:
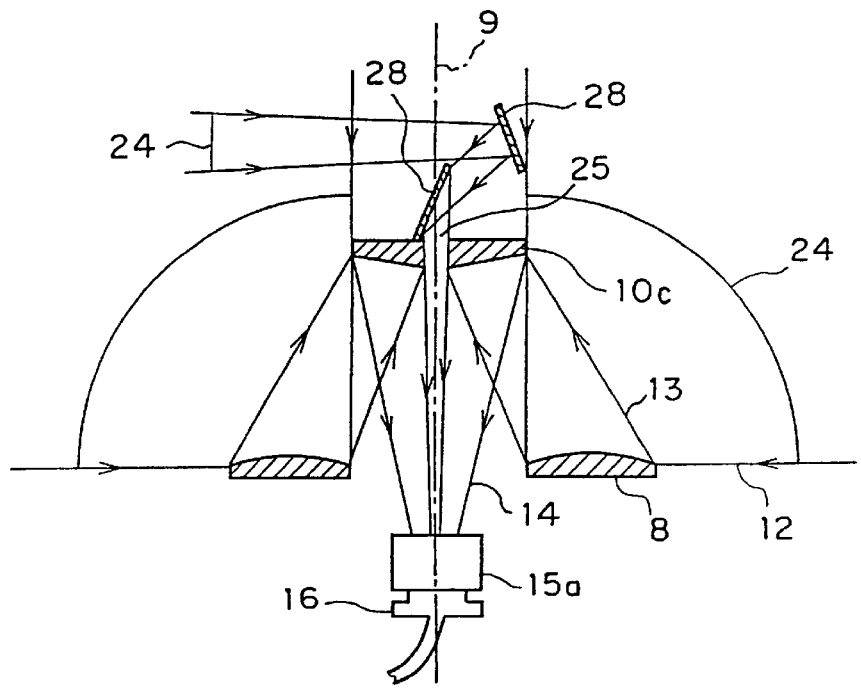

FIGS. 20(A), (B) are structural views, partly in section, showing one embodiment of a reflection type angle of view transforming optical apparatus of the present invention. In the drawing, reference numeral 28 means a plane mirror mounted at an upper portion of a secondary mirror 10c. As in the case of the embodiment 12, the secondary mirror 10c is provided with a transmitting portion 25 to transmit incident light 12, a telephoto lens 15a is mounted to a CCD camera 16, and the two plane mirrors 28 are combined at the upper portion of the transmitting portion 25 of the secondary mirror 10c. In this case, in a state of FIG. 20(A), it is possible to concurrently observe a wide angle image through a primary mirror 8 and the secondary mirror 10c, and a direct image independent of both the mirrors as shown in FIG. 19. Further, as shown in a state of FIG. 20(B), it is possible to freely change a direction of a center field of view 24 by appropriately changing positions or angles of the plane mirrors 28. That is, it is possible to concurrently enlarge only a desired portion for observation while observing the wide angle image. It must be noted that the number or an arrangement of the plane mirrors should not be limited in particular.

Embodiment 14

Figure 21:
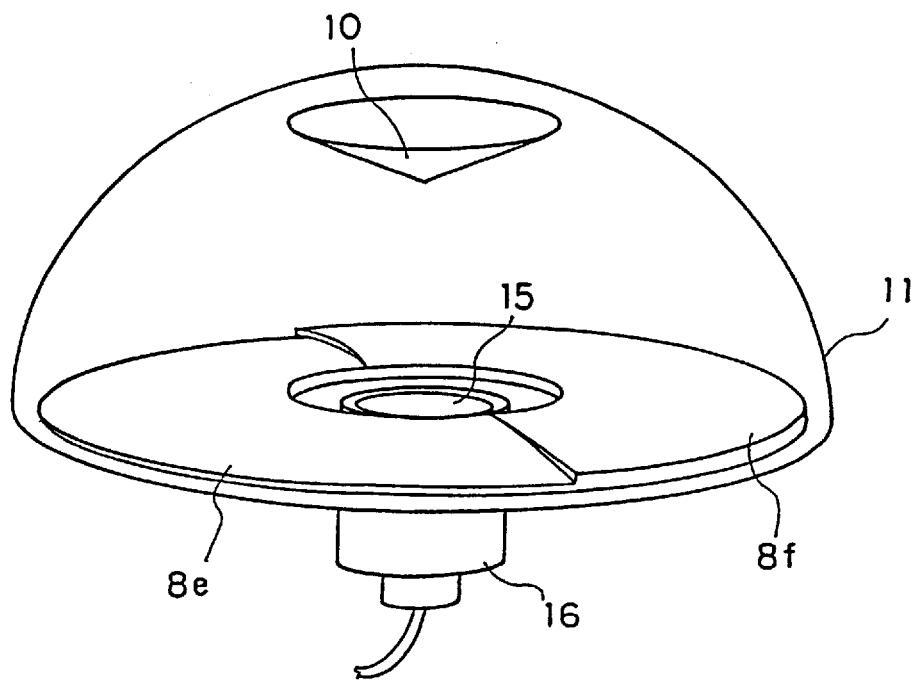
FIG. 21 is a structural view, partly in section, showing one embodiment of the reflection type angle of view transforming optical apparatus according to one embodiment of the present invention.
Figure 22:
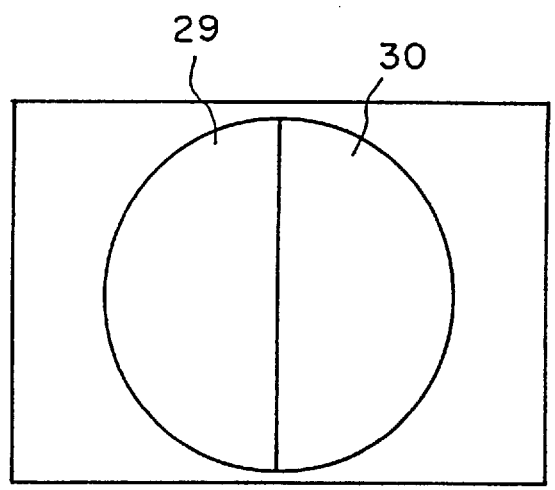
FIG. 22 is a plan view showing an image obtained by the apparatus of FIG. 21.

FIG. 21 is a structural view, partly in section, showing one embodiment of a reflection type angle of view transforming optical apparatus according to one embodiment of the present invention. In the drawing, reference numerals 8e, 8f mean primary mirrors divided into two pieces in a circumferential direction of an axis of rotational symmetry 9 (not shown). Reflecting surfaces of the primary mirrors 8e, 8f are formed to respectively provide different relationships between an angle of incident light 12 and an angle of secondary reflected light 14. Further, FIG. 22 shows an image obtained by the apparatus in the embodiment. In the drawing, reference numeral 29 means an image obtained by the primary mirror 8e, and 30 is an image obtained by the primary mirror 8f. The forms of the reflecting surfaces of the primary mirrors 8c, 8f enable observation of an object in a field of view 24 around the axis of rotational symmetry 9 in two kinds of angles of view. Further, the primary mirrors 8e, 8f can be rotated by a supporting/rotatable drive member (not shown) to store images before and after rotating the primary mirrors 8e, 8f about the axis of rotational symmetry 9 by 180° in a storage section or the like. Thereafter, the stored images can be synthesized to provide an image of an entire periphery about the axis of rotational symmetry 9 of the respective angles of view. Though the primary mirror 8 is divided into two pieces in the embodiment, it is possible to observe in three or more angles of view by dividing the primary mirror 8 into three or more pieces. Alternatively, needless to say, a secondary mirror 10 may similarly be divided in a circumferential direction to provide the same effect, instead of dividing the primary mirror.

Embodiment 15

Figure 23:
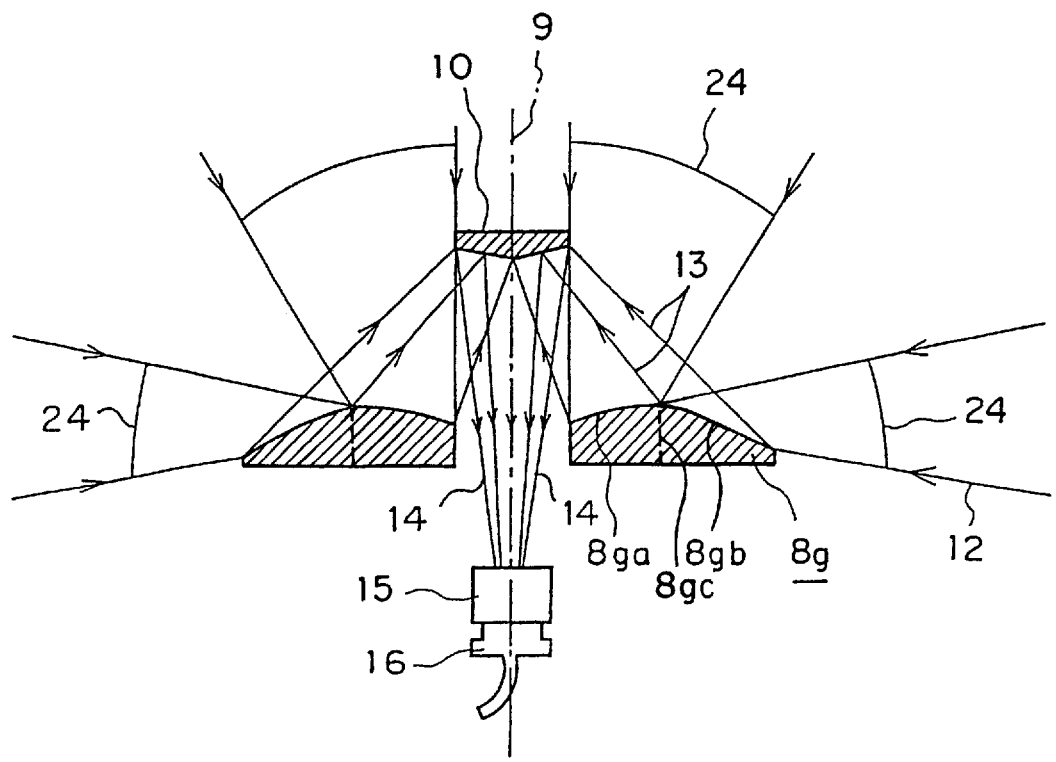
FIG. 23 is a structural view, partly in section, showing one embodiment of the reflection type angle of view transforming optical apparatus of the present invention.
Figure 24:
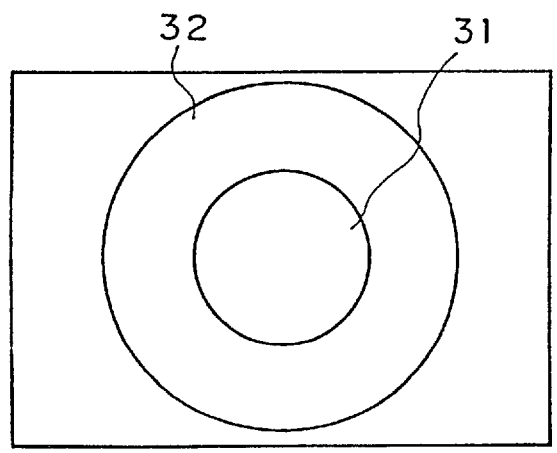
FIG. 24 is a plan view showing an image obtained by the apparatus of FIG. 23.

FIG. 23 is a structural view, partly in section, showing one embodiment of a reflection type angle of view transforming optical apparatus of the present invention. In the drawing, reference numeral 8g means a primary mirror. The primary mirror 8g is divided at a dividing line 8gc into two different partial mirrors 8ga, 8gb which are concentrically provided. The divided reflecting surfaces are formed to provide different relationships between an angle of incident light 12 and an angle of secondary reflected light 14. Further, FIG. 24 shows an image obtained by the apparatus in the embodiment. In the drawing, reference numeral 31 means an image obtained by the partial mirror 8ga, and 32 is an image obtained by the partial mirror 8gb. The forms of the reflecting surfaces of the partial mirrors 8ga, 8gb enable concurrent observation of an object in two kinds of fields of view 24 about an axis of rotational symmetry 9. Though the primary mirror 8g is divided into two pieces in the embodiment, needless to say, it is possible to observe in three or more angles of view by dividing the primary mirror into three or more pieces. Further, instead of the primary mirror 8g, a secondary mirror 10 may be divided to provide the same effect.

Embodiment 16

Figure 25:
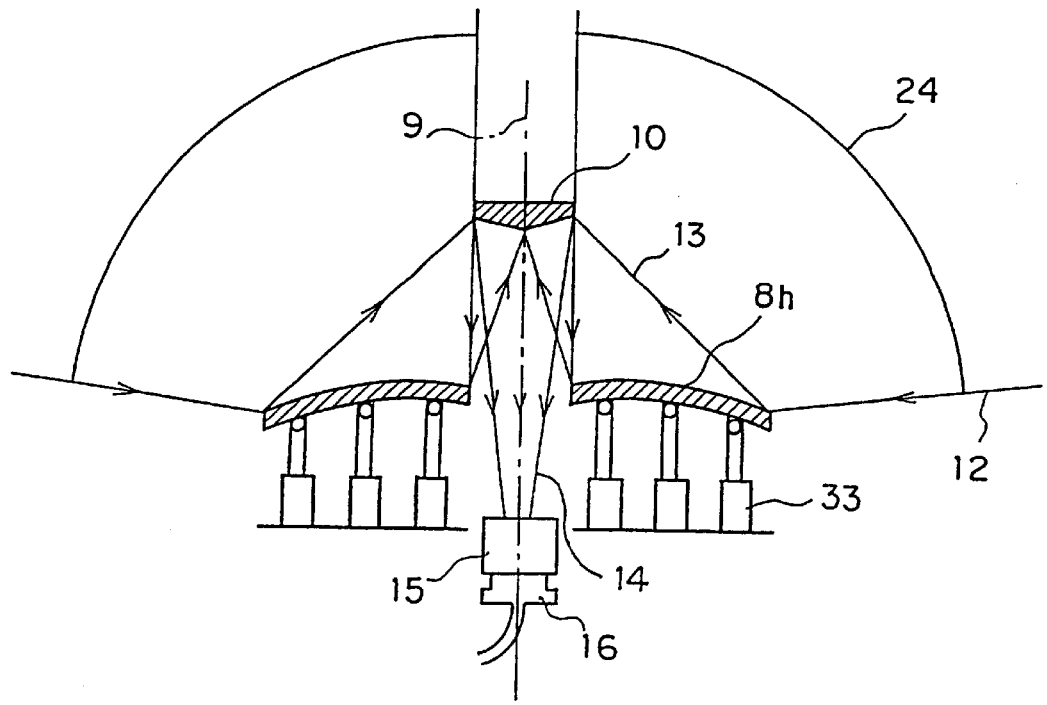
FIG. 25 is a structural view, partly in section, showing one embodiment of the reflection type angle of view transforming optical apparatus of the present invention.

FIG. 25 is a structural view, partly in section, showing one embodiment of a reflection type angle of view transforming optical apparatus of the present invention. In the drawing, reference numeral 8h means a primary mirror, and the primary mirror 8h is made of flexible material. Further, reference numeral 33 means an actuator (a drive unit) attached to a back face of a reflecting surface of the primary mirror 8h. Therefore, the reflecting surface of the primary mirror 8h is deformed by driving the actuator 33 to vary a relationship between incident light 12 and secondary reflected light 14, thereby providing an infinite kind of angle of view. It must be noted that, instead of the primary mirror, a secondary mirror may be made of flexible material to be deformed by the actuator to a desired form.

Embodiment 17

Figure 26:
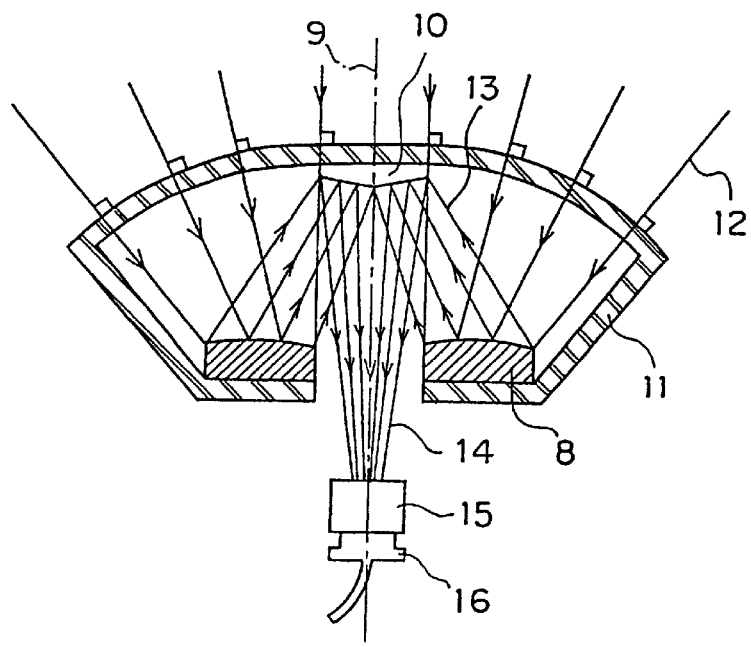
FIG. 26 is a structural view, partly in section, showing one embodiment of the reflection type angle of view transforming optical apparatus of the present invention.

FIG. 26 is a structural view, partly in section, showing one embodiment of a reflection type angle of view transforming optical apparatus of the present invention. In the drawing, reference numeral 11 means a transparent cover serving as a supporting member. The transparent cover 11 is formed such that a tangent plane at a transmission point of the transparent cover 11 extends perpendicular to all of incident lights 12 collected at a view point 17. Consequently, since the incident light 12 passes through the transparent cover 11 without refraction, an incident angle of the incident light is not varied.

Embodiment 18

Figure 27:
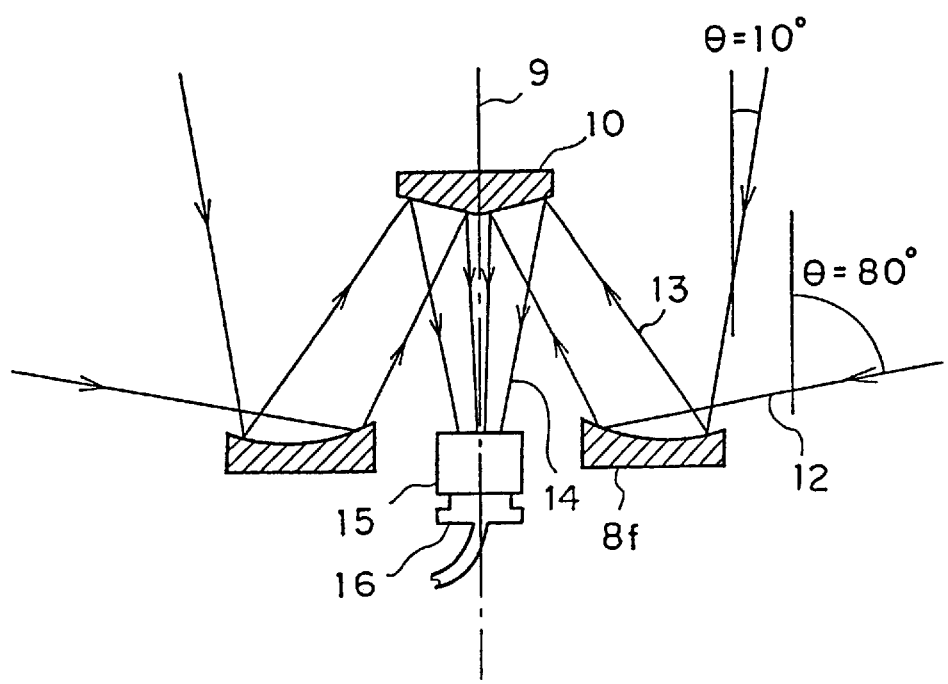
FIG. 27 is a structural view, partly in section, showing one embodiment of the reflection type angle of view transforming optical apparatus of the present invention.
Figure 28:
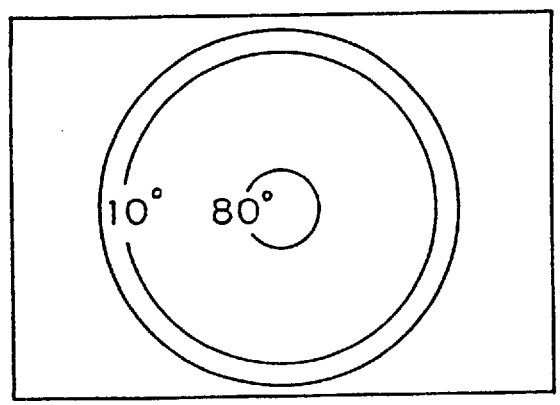
FIG. 28 is a plan view showing an image obtained by the apparatus of FIG. 27.

FIG. 27 is a structural view, partly in section, showing one embodiment of a reflection type angle of view transforming optical apparatus of the present invention. In the drawing, reference numeral 8i means a primary mirror, and the primary mirror 8i has a concave reflecting surface. Accordingly, in an obtained image, an object in a front direction of the apparatus and an object in a side surface direction thereof are respectively projected onto opposite positions. That is, as shown in FIG. 28, an object in a direction having an incident angle θ of 80° is projected onto a center portion of the image, and an object in a direction having an incident angle θ of 10° is projected onto a peripheral portion of the image. Needless to say, a concave primary mirror or a concave secondary mirror may be employed as the above-mentioned embodiment of the present invention.

Embodiment 19

Figure 29:
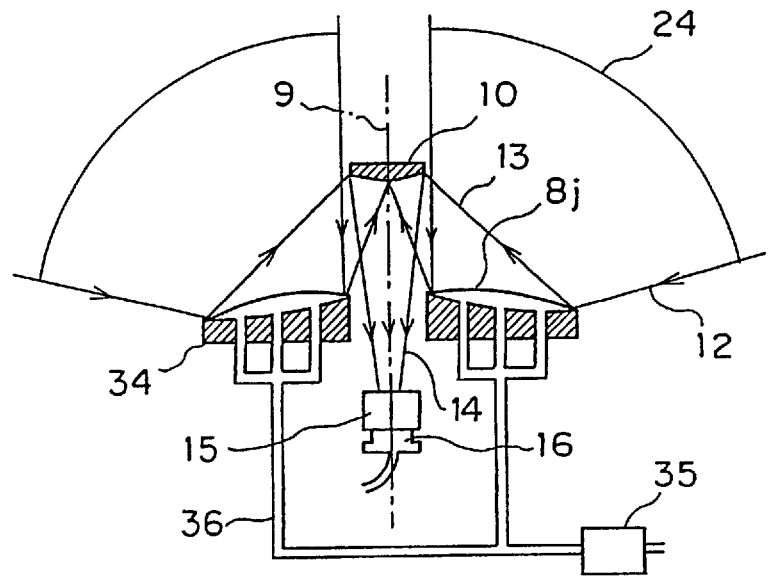
FIG. 29 is a structural view, partly in section, showing one embodiment of the reflection type angle of view transforming optical apparatus of the present invention.
Figure 29:
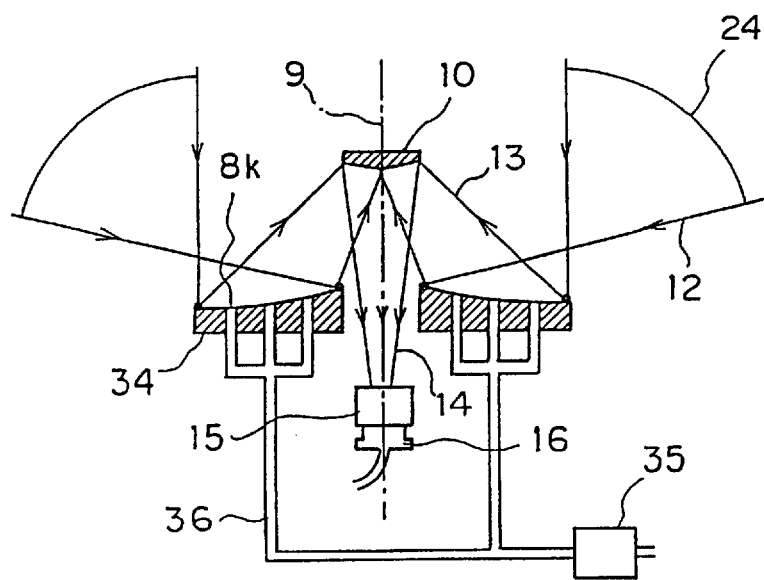

FIGS. 29(A), (B) are structural views, partly in section, showing one embodiment of a reflection type angle of view transforming optical apparatus of the present invention. In the drawing, reference numerals 8j, 8k mean primary mirrors, and the primary mirrors 8j and 8k are made of thin material having a mirror-like surface. Reference numeral 34 means primary mirror absorbing plate, and the primary mirror absorbing plate 34 is jointed to the primary mirrors 8j, 8k at an outer periphery and at an inner periphery. Further, reference numeral 35 means a pump serving as a drive unit, and 36 is a pipe to connect the primary mirror absorbing plate 34 to the pump 35. In a state of FIG. 29(A), air is fed from the pump 35 to the primary mirror absorbing plate 34 to expand the primary mirror 8j, resulting in a convex reflecting surface of the primary mirror 8j. In an obtained image, an object in a front direction of the apparatus is projected onto an intermediate portion of the image, and an object in a side surface direction is projected onto a peripheral portion of the image. In a state of FIG. 29(B), since the primary mirror 8k is absorbed by the pump 35 to the primary mirror absorbing plate 34, the primary mirror 8k has a concave reflecting surface. In an obtained image, as in the case of the embodiment 18, the object in the front direction of the apparatus is projected onto the peripheral portion of the image, and the object in the side surface direction thereof is projected onto a center portion of the image. That is, two kinds of projection modes can be switched over.

Embodiment 20

A primary mirror and a secondary mirror supported by a supporting member, a supporting/rotatable member, a supporting/movable member, or a supporting/rotatable drive member in the embodiments 1 to 19. However, In the embodiment 20, the primary mirror and the secondary mirror may be removable, or switchable by sliding. In this case, it is possible to provide an infinite kind of angle of view.

Embodiment 21

Figure 30:
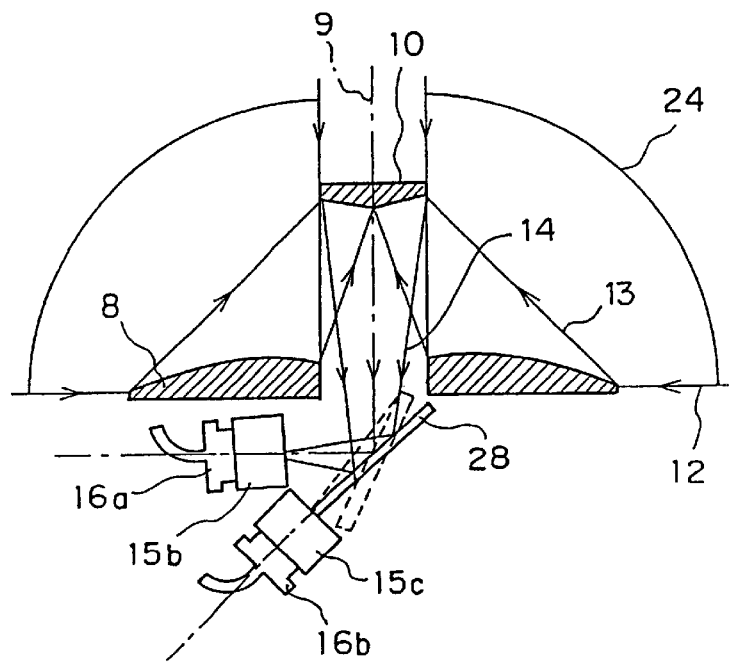
FIG. 30 is a structural view, partly in section, showing one embodiment of the reflection type angle of view transforming optical apparatus of the present invention.
Figure 31:
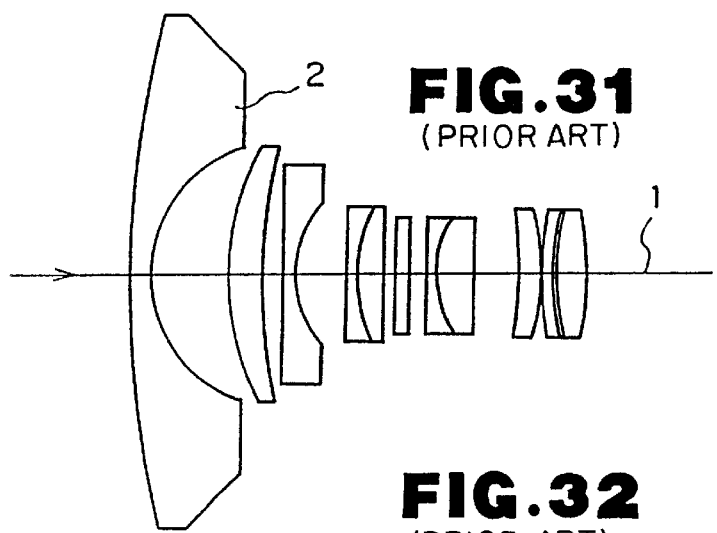
FIG. 31 is a sectional view showing a conventional super wide angle lens.
Figure 32:
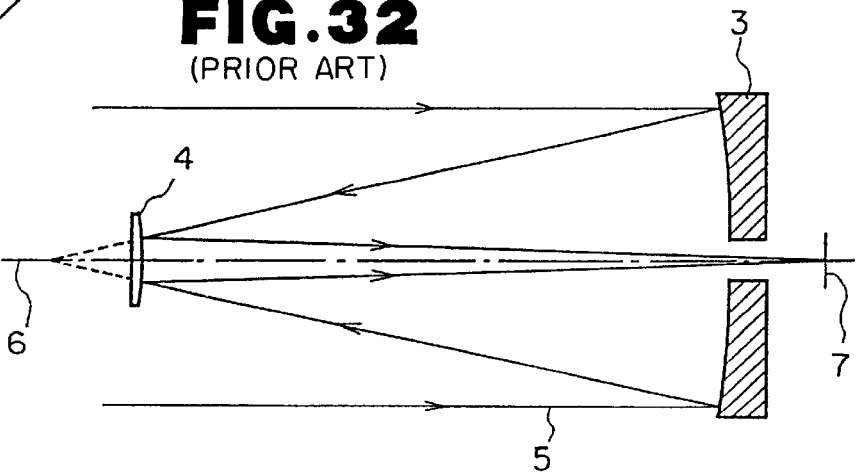
FIG. 32 is a sectional view showing reflecting mirrors of a conventional Cassegrainian reflector.

FIG. 30 is a structural view, partly in section, showing one embodiment of a reflection type angle of view transforming optical apparatus of the present invention. In the drawing, reference numeral 15b means a visible light lens, 15c is an infrared lens, 16a is a visible light CCD camera, and 16b is an infrared CCD camera. The apparatus can be used for infrared radiation, and other electromagnetic waves as well as visible light. The visible light CCD camera 16a and the infrared CCD camera 16b can be switched over by rotating a plane mirror 28 which is rotatably supported, to vary an optical path of secondary reflected light 14. Alternatively, it must be noted that the structure using the visible light CCD camera 16a, the infrared CCD camera 16b and so forth may be built into the above embodiments.

Embodiment 22

An apparatus of the present invention may be used as a projector by putting a light source or the like at a position of the CCD camera 16 in the embodiments.

INDUSTRIAL APPLICABILITY

As set forth above, according to the present invention, a reflection type angle of view transforming optical apparatus includes a primary mirror having a reflecting surface provided in an axisymmetric form to reflect incident light as primary reflected light, a secondary mirror having a reflecting surface provided in an axisymmetric form about the same axis of rotational symmetry as that of the primary mirror, opposed to the primary mirror so as to reflect the primary reflected light as secondary reflected light for focusing on a view point, and a supporting member to support the primary mirror and the secondary mirror and transmit the incident light. Thus, it is possible to focus the wide angle incident light on the view point, and provide a desired angle of view according to a design condition. Further, since the primary mirror and the secondary mirror can be processed by material such as metal, it is possible to provide sufficient strength and facilitate the process. In addition, there is an effect in that it is possible to provide the reflection type angle of view transforming optical apparatus without chromatic aberration and absorption.

Further, according to the present invention, a reflection type angle of view transforming optical apparatus includes a primary mirror having a reflecting surface provided in an axisymmetric form, and including a plurality of different partial mirrors to reflect incident light as primary reflected light, a secondary mirror having a reflecting surface provided in an axisymmetric form about the same axis of rotational symmetry as that of the primary mirror, opposed to the primary mirror so as to reflect the primary reflected light as secondary reflected light for focusing on a view point, and a supporting/movable member to support at least one of the primary mirror and the secondary mirror slidably in a direction of the axis of rotational symmetry, and transmit incident light from an object. Therefore, it is possible to focus different wide angle incident lights on the view point, and provide a desired angle of view by using the supporting/movable member to adjust an interval between the primary mirror and the secondary mirror according to angles of the primary reflected lights respectively reflected from the plurality of different partial mirrors of the primary mirror. Further, since the primary mirror and the secondary mirror can be processed by material such as metal, it is possible to provide sufficient strength and facilitate the process. In addition, there is an effect in that it is possible to provide the reflection type angle of view transforming optical apparatus without chromatic aberration and absorption.

Further, according to the present invention, a reflection type angle of view transforming optical apparatus includes a plurality of primary mirrors to reflect incident light as primary reflected light, a secondary mirror selectively combined with one of the primary mirrors to reflect the primary reflected light as secondary reflected light for focusing on a view point, a supporting/rotatable member to support the secondary mirror, support the plurality of primary mirrors about an axis of rotation in an arbitrarily set direction, and transmit the incident light. In addition, reflecting surfaces of the plurality of primary mirrors are formed to respectively provide different relationships between an angle between an axis of rotational symmetry of the primary mirror and the secondary mirror and the incident light, and an angle between the axis of rotational symmetry and the secondary reflected light. Consequently, the plurality of primary mirrors can be switched over by the supporting/rotatable member to focus different wide angle incident lights on the view point, and provide a desired angle of view. Further, since the primary mirror and the secondary mirror can be processed by material such as metal, it is possible to provide sufficient strength and facilitate the process. In addition, there is an effect in that it is possible to provide the reflection type angle of view transforming optical apparatus without chromatic aberration and absorption.

Further, according to the present invention, a reflection type angle of view transforming optical apparatus includes a primary mirror to reflect incident light as primary reflected light, a plurality of secondary mirrors selectively combined with the primary mirror to reflect the primary reflected light as secondary reflected light for focusing on a view point, and a supporting/rotatable member to support the primary mirror, support the plurality of secondary mirrors rotatably about an axis of rotation in an arbitrarily set direction, and transmit the incident light. In addition, reflecting surfaces of the plurality of secondary mirrors are formed to respectively provide different relationships between an angle between an axis of rotational symmetry of the primary mirror and the secondary mirror and the incident light, and an angle between the axis of rotational symmetry and the secondary reflected light. Consequently, the plurality of secondary mirrors can be switched over to focus different wide angle incident lights on the view point, and provide a desired angle of view. Further, since the primary mirror and the secondary mirror can be processed by material such as metal, it is possible to provide sufficient strength and facilitate the process. In addition, there is an effect in that it is possible to provide the reflection type angle of view transforming optical apparatus without chromatic aberration and absorption.

Further, according to the present invention, a reflection type angle of view transforming optical apparatus includes a plurality of primary mirrors to reflect incident light as primary reflected light, a secondary mirror selectively combined with one of the primary mirrors to reflect the primary reflected light as secondary reflected light for focusing on a view point, and a supporting/movable member to support the secondary mirror, support the plurality of primary mirrors slidably in an arbitrarily set direction, and transmit the incident light. In addition, reflecting surfaces of the plurality of primary mirrors are formed to respectively provide different relationships between an angle between an axis of rotational symmetry of the primary mirror and the secondary mirror and the incident light, and an angle between the axis of rotational symmetry and the secondary reflected light. Consequently, the plurality of primary mirrors can be switched over by the supporting/movable member to focus different wide angle incident lights on the view point, and provide a desired angle of view. Further, since the primary mirror and the secondary mirror can be processed by material such as metal, it is possible to provide sufficient strength and facilitate the process. In addition, there is an effect in that it is possible to provide the reflection type angle of view transforming optical apparatus without chromatic aberration and absorption.

Further, according to the present invention, a reflection type angle of view transforming optical apparatus includes a primary mirror to reflect incident light as primary reflected light, a plurality of secondary mirrors selectively combined with the primary mirror to reflect the primary reflected light as secondary reflected light for focusing on a view point, and a supporting/movable member to support the primary mirror, support the plurality of secondary mirrors slidably in an arbitrarily set direction, and transmit the incident light. In addition, reflecting surfaces of the plurality of secondary mirrors are formed to respectively provide different relationships between an angle between an axis of rotational symmetry of the primary mirror and the secondary mirror and the incident light, and an angle between the axis of rotational symmetry and the secondary reflected light. Consequently, the plurality of secondary mirrors can be switched over by the supporting/movable member to focus different wide angle incident lights on the view point, and provide a desired angle of view. Further, since the primary mirror and the secondary mirrors can be processed by material such as metal, it is possible to provide sufficient strength and facilitate the process. In addition, there is an effect in that it is possible to provide the reflection type angle of view transforming optical apparatus without chromatic aberration and absorption.

Further, according to the present invention, a reflection type angle of view transforming optical apparatus includes a primary mirror to reflect incident light as primary reflected light, a secondary mirror to reflect the primary reflected light as secondary reflected light for focusing on a view point, and a supporting/movable member to support at least one of the primary mirror and the secondary mirror slidably in a direction of an axis of rotational symmetry of the primary mirror and the secondary mirror, and transmit the incident light from an object. In addition, reflecting surfaces of the plurality of secondary mirrors are formed such that a relationship between an angle between the axis of rotational symmetry of the primary mirror and the secondary mirror and the incident light, and an angle between the axis of rotational symmetry and the secondary reflected light is varied according to an interval between the primary mirror and the secondary mirror after sliding. Consequently, the interval between the primary mirror and the secondary mirror is adjusted by the supporting/movable member to vary an angle of the incident light into the primary mirror, an angle of the primary reflected light into the secondary mirror, and an angle of the secondary reflected light mirror into a view point. Thus, it is possible to focus different wide angle incident lights on the view point, and provide a desired angle of view. Further, since the primary mirror and the secondary mirror can be processed by material such as metal, it is possible to provide sufficient strength and facilitate the process. In addition, there is an effect in that it is possible to provide the reflection type angle of view transforming optical apparatus without chromatic aberration and absorption.

Further, according to the present invention, a reflection type angle of view transforming optical apparatus includes a primary mirror to reflect incident light as primary reflected light, a secondary mirror to reflect the primary reflected light as secondary reflected light for focusing on a view point, and a supporting member to support the primary mirror and the secondary mirror, and transmit the incident light. In addition, at least one of the primary mirror and the secondary mirror is provided with a transmitting portion. Therefore, the transmitting portion can transmit the incident light, and the view point can be irradiated with the incident light passing through the transmitting portion together with the secondary reflected light focused on the view point. In case the primary mirror is provided with the transmitting portion, it is possible to concurrently observe a wide angle image reflected from the primary mirror and the secondary mirror, and an image passing through the transmitting portion of the primary mirror to be reflected from only the secondary mirror. In case the secondary mirror is provided with the transmitting portion, it is possible to concurrently observe a wide angle image reflected from the primary mirror and the secondary mirror, and a direct image passing through the transmitting portion of the secondary mirror. Further, since the primary mirror and the secondary mirror can be processed by material such as metal, it is possible to provide sufficient strength and facilitate the process. In addition, there is an effect in that it is possible to provide the reflection type angle of view transforming optical apparatus without chromatic aberration and absorption.

Further, according to the present invention, a reflection type angle of view transforming optical apparatus includes a primary mirror to reflect incident light as primary reflected light, a secondary mirror to reflect the primary reflected light as secondary reflected light for focusing on a view point, and a supporting member to support the primary mirror and the secondary mirror, and transmit the incident light. In addition, at least one of the primary mirror and the secondary mirror is provided with a transmitting portion, and a plane mirror is attached in a direction of an observing object with respect to the transmitting portion so as to introduce the incident light into the transmitting portion. Therefore, the transmitting portion can transmit the incident light, and the view point can be irradiated with the incident light passing through the transmitting portion together with the secondary reflected light focused on the view point. In case the primary mirror is provided with the transmitting portion, it is possible to concurrently observe a wide angle image reflected from the primary mirror and the secondary mirror, and an image passing through the transmitting portion of the primary mirror to be reflected from only the secondary mirror. In case the secondary mirror is provided with the transmitting portion, it is possible to concurrently observe a wide angle image reflected from the primary mirror and the secondary mirror, and a direct image passing through the transmitting portion of the secondary mirror. It is possible to vary a direction of the incident light passing through the transmitting portion by rotating the plane mirror which is rotatably supported. Further, since the primary mirror and the secondary mirror can be processed by material such as metal, it is possible to provide sufficient strength and facilitate the process. In addition, there is an effect in that it is possible to provide the reflection type angle of view transforming optical apparatus without chromatic aberration and absorption.

Further, according to the present invention, a reflection type angle of view transforming optical apparatus includes a primary mirror to reflect incident light as primary reflected light, a secondary mirror to reflect the primary reflected light as secondary reflected light for focusing on a view point, and a supporting member to support the primary mirror and the secondary mirror, and transmit the incident light. In addition, at least one of the primary mirror and the secondary mirror is divided into a plurality of pieces in a circumferential direction of an axis of rotational symmetry, and the plurality of divided reflecting surfaces are formed to respectively provide different relationships between an angle between the axis of rotational symmetry and the incident light, and an angle between the axis of rotational symmetry and the secondary reflected light. Thus, in the reflecting surfaces divided into the plurality of pieces in the circumferential direction of the axis of rotational symmetry of at least one of the primary mirror and the secondary mirror, it is possible to concurrently focus a plurality of different wide angle incident lights on the view point, and provide a desired angle of view. Further, since the primary mirror and the secondary mirror can be processed by material such as metal, it is possible to provide sufficient strength and facilitate the process. In addition, there is an effect in that it is possible to provide the reflection type angle of view transforming optical apparatus without chromatic aberration and absorption.

Further, according to the present invention, a reflection type angle of view transforming optical apparatus includes a primary mirror to reflect incident light as primary reflected light, a secondary mirror to reflect the primary reflected light as secondary reflected light for focusing on a view point, a supporting/rotatable drive member to support the primary mirror and the secondary mirror so as to rotationally drive about an axis of rotational symmetry of the primary mirror and the secondary mirror, and transmit the incident light, and a storage section to store the secondary reflected light focused on the view point. Consequently, it is possible to use the supporting/rotatable drive member so as to rotate the reflecting surfaces divided into the plurality of pieces in a circumferential direction of the axis of rotational symmetry of at least one of the primary mirror and the secondary mirror, and store the secondary reflected light focused on the view point in the storage section. It is thereby possible to obtain incident light in different types of angles of view in an entire area about the axis of rotational symmetry. Further, since the primary mirror and the secondary mirror can be processed by material such as metal, it is possible to provide sufficient strength and facilitate the process. In addition, there is an effect in that it is possible to provide the reflection type angle of view transforming optical apparatus without chromatic aberration and absorption.

Further, according to the present invention, a reflection type angle of view transforming optical apparatus includes a primary mirror to reflect incident light as primary reflected light, a secondary mirror to reflect the primary reflected light as secondary reflected light for focusing on a view point, and a supporting member to support the primary mirror and the secondary mirror, and transmit the incident light. At least one of the primary mirror and the secondary mirror is divided into a plurality of pieces in a concentric manner, and the plurality of divided reflecting surfaces are formed to provide different relationships between an angle between an axis of rotational symmetry thereof and the incident light, and an angle between the axis of rotational symmetry and the secondary reflected light. Therefore, in the plurality of reflecting surfaces divided in a concentric manner of at least one of the primary mirror and the secondary mirror, it is possible to concurrently focus different types of wide angle incident lights on the view point, and provide a desired angle of view. Further, since the primary mirror and the secondary mirror can be processed by material such as metal, it is possible to provide sufficient strength and facilitate the process. In addition, there is an effect in that it is possible to provide the reflection type angle of view transforming optical apparatus without chromatic aberration and absorption.

Further, according to the present invention, a reflection type angle of view transforming optical apparatus includes a primary mirror to reflect incident light as primary reflected light, a secondary mirror to reflect the primary reflected light as secondary reflected light for focusing on a view point, and a supporting member to support the primary mirror and the secondary mirror, and transmit the incident light. At least one of the primary mirror and the secondary mirror is made of flexible material, and a drive unit is attached to the mirror. Therefore, it is possible to focus a wide angle incident light on the view point, and provide a desired angle of view by deforming the mirror by the drive unit. In addition, there is an effect in that it is possible to provide the reflection type angle of view transforming optical apparatus without chromatic aberration and absorption since an optical system includes the reflecting mirrors.

Further, according to the present invention, a reflection type angle of view transforming optical apparatus includes a primary mirror to reflect incident light as primary reflected light, a secondary mirror to reflect the primary reflected light as secondary reflected light for focusing on a view point, and a supporting member to support the primary mirror and the secondary mirror, and transmit the incident light. The supporting member is formed such that a transmitting surface extends perpendicular to all of the incident lights focused on the view point. Therefore, it is possible to focus a wide angle incident light on the view point, and provide a desired angle of view according to a design condition. Since the incident light can pass through the supporting member without refraction, an incident angle of the incident light is not varied. Further, since the primary mirror and the secondary mirror can be processed by material such as metal, it is possible to provide sufficient strength and facilitate the process. In addition, there is an effect in that it is possible to provide the reflection type angle of view transforming optical apparatus without chromatic aberration and absorption.

Further, according to the present invention, a primary mirror and a secondary mirror are exchangeably supported by a supporting member, a supporting/rotatable member, a supporting/movable member or a supporting/rotatable drive member. As a result, it is possible to provide an infinite type angle of view.

What is claimed is:

1. A reflection-type angle-of-view-transforming optical apparatus comprising:

a primary mirror having a primary reflecting surface provided in an axisymmetric form about an axis of rotational symmetry, the primary mirror being an annular member having an inner periphery and an outer periphery, the inner periphery thereof defining an aperture on the axis of rotational symmetry through which light is to be reflected, the primary mirror being constructed and arranged to receive incident light from an observed object and to reflect the incident light from the primary reflecting surface as primary reflected light;

a secondary mirror having a secondary reflecting surface provided in an axisymmetric form about the axis of rotational symmetry, the secondary mirror being disposed with the secondary reflecting surface facing the primary reflecting surface so that the secondary reflecting surface receives the primary reflected light and reflects the primary reflected light as secondary reflected light, the secondary mirror being constructed and arranged to focus the secondary reflected light on a view point that is positioned on the axis of rotational symmetry; and an optically transparent cover constructed and arranged to support the primary mirror and the secondary mirror relative to each other so that the secondary mirror is axially aligned with the aperture, wherein the primary reflecting surface has a convex shape relative to the incident light received thereon in a radial direction, a sectional shape of the primary mirror being defined by an equation $y=f_1(x)$ under a condition that an incident angle $\theta$, a sectional shape of the secondary mirror and a relationship defined by $\theta=g(\phi)$ are satisfied, $f_1(x)$ being determined by numerically integrating a first order derivative $f_1'(M_x)$ defined as follows:

$$f'_1(M_x) = \frac{D\cos\phi - M_y - \sqrt{D^2 - 2(M_x\sin\phi + M_y\cos\phi)D + M_x^2 + M_y^2} \quad (\cos\theta)}{D\sin\phi - M_x - \sqrt{D^2 - 2(M_x\sin\phi + M_y\cos\phi)D + M_x^2 + M_y^2} \quad (\sin\theta)}$$

from a point $M_1$ on the inner periphery of the primary mirror to a point $(M_x, M_y)$, wherein $(M_x, M_y)$ is a coordinate point on the primary reflecting surface, $\theta$ is an incident angle of the incident light to the primary mirror, $\phi$ is an incident angle of the secondary reflected light from the secondary mirror to the view point, P is a point on the secondary reflecting surface, and D is a distance between the viewpoint and P, and wherein the secondary reflecting surface has a nonplanar shape relative to the primary reflected light received thereon to focus the secondary reflected light through the aperture.

2. The reflection-type angle-of-view-transforming optical apparatus according to claim 1, wherein at least one of the primary mirror and the secondary mirror is supported by a supporting member, a supporting/rotatable member, a supporting/movable member or a supporting/rotatable drive member, at least one of the primary reflecting surface and the secondary reflecting surface having a first form, the at least one of the primary mirror and the secondary mirror being exchangeable for a mirror having a primary reflecting surface or a secondary reflecting surface respectively with a second form that is different from the first form.

3. The reflection-type angle-of-view-transforming optical apparatus according to claim 1, wherein at least one of the primary mirror and the secondary mirror is divided into a plurality of partial mirrors in a concentric manner, the plurality of partial mirrors having reflecting surfaces that are arranged to provide different relationships between the incident angle $\theta$ between the axis of rotational symmetry and the incident light, and the incident angle $\phi$ between the axis of rotational symmetry and the secondary reflected light.

4. The reflection-type angle-of-view-transforming optical apparatus according to claim 1, wherein the cover is movable.

5. The reflection-type angle-of-view-transforming optical apparatus according to claim 4, wherein the cover is rotatable.

6. The reflection-type angle-of-view-transforming optical apparatus according to claim 1, wherein at least one of the primary reflecting surface and the secondary reflecting surface has a first form, the at least one of the primary reflecting surface and the secondary reflecting surface being exchangeable for a reflecting surface with a second form that is different from the first form.

7. The reflection-type angle-of-view-transforming optical apparatus according to claim 1, further comprising a lens that is fixed to the primary mirror and is positioned at the view point to receive the secondary reflected light.

8. The reflection-type angle-of-view-transforming optical apparatus according to claim 7, further comprising a camera attached to the lens.

9. The reflection-type angle-of-view-transforming optical apparatus according to claim 1, wherein the secondary reflecting surface is convex relative to the primary reflected light received thereon.

10. The reflection-type angle-of-view-transforming optical apparatus according to claim 1, wherein the cover is constructed and arranged to transmit the incident light over an angle-of-view of at least 180 degrees.

11. The reflection-type angle-of-view-transforming optical apparatus according to claim 10, wherein the cover is shaped as a hemispherical dome.

12. The reflection-type angle-of-view-transforming optical apparatus according to claim 1, wherein the secondary reflecting surface is conical.

13. The reflection-type angle-of-view-transforming optical apparatus according to claim 1, wherein the aperture has a diameter and the secondary mirror has an outer periphery with a diameter that is comparable to the diameter of the aperture.

14. The reflection-type angle-of-view-transforming optical apparatus according to claim 1, wherein the primary mirror has a base plane, the primary reflecting surface being disposed on one side of the base plane and the viewpoint being disposed on the opposite side of the base plane of the primary mirror.

15. The reflection-type angle-of-view-transforming optical apparatus according to claim 1, wherein the cover has a first surface area through which incident light can be transmitted to the primary reflecting surface and a second surface area through which incident light cannot be transmitted to the primary reflecting surface, the first surface area being substantially greater than the second surface area.

16. The reflection-type angle-of-view-transforming optical apparatus according to claim 15, wherein the secondary mirror has an outer periphery and the second surface area of the cover is defined by the outer periphery of the secondary mirror.

17. A reflection-type angle-of-view-transforming optical apparatus comprising:

a primary mirror having a primary reflecting surface provided in an axisymmetric form about an axis of rotational symmetry, the primary mirror being an annular member having an inner periphery and an outer periphery, the inner periphery having an inner diameter defining an aperture through which light is to be reflected, the primary mirror being constructed and arranged to receive incident light from an observed object and to reflect the incident light from the primary reflecting surface as primary reflected light;

a secondary mirror having a secondary reflecting surface provided in an axisymmetric form about the axis of rotational symmetry, the secondary mirror being disposed with the secondary reflecting surface facing the primary reflecting surface so that the secondary reflecting surface receives and reflects the primary reflected light from the primary mirror as secondary reflected light, the secondary mirror being constructed and arranged to focus the secondary reflected light on a view point positioned at the aperture on the axis of rotational symmetry; and an optically transparent cover constructed and arranged to support the primary mirror and the secondary mirror relative to each other and coaxial with the aperture;

wherein at least one of the primary mirror and the secondary mirror is divided into a plurality of concentric partial mirrors, each of the plurality of concentric partial mirrors having an annular reflecting surface with a convex shape relative to the incident light received thereon in a radial direction, a sectional shape of the primary mirror being defined by an equation $y = f_1(x)$ under a condition that an incident angle $\theta$, a sectional shape of the secondary mirror and a relationship defined by $\theta = g(\phi)$ are satisfied, $f_1(x)$ being determined by numerically integrating a first order derivative $f_1'(M_x)$ defined as follows:

$$f'_1(M_x) = \frac{D\cos\phi - M_y - \sqrt{D^2 - 2(M_x\sin\phi + M_y\cos\phi)D + M_x^2 + M_y^2} \quad (\cos\theta)}{D\sin\phi - M_x - \sqrt{D^2 - 2(M_x\sin\phi + M_y\cos\phi)D + M_x^2 + M_y^2} \quad (\sin\theta)}$$

from a point $M_1$ on the inner periphery of the primary mirror to a point $(M_x, M_y)$, wherein $(M_x, M_y)$ is a coordinate point on the primary reflecting surface, θ is an incident angle of the incident light to the primary mirror, φ is an incident angle of the secondary reflected light from the secondary mirror to the view point, P is a point on the secondary reflecting surface, and D is a distance between the viewpoint and P, the reflecting surfaces of the plurality of concentric partial mirrors being formed to provide different relationships between the incident angle θ between the axis of rotational symmetry and the incident light and the incident angle φ between the axis of rotational symmetry and the secondary reflected light so that the object can be concurrently observed in separate fields of view.

18. A reflection-type angle-of-view-transforming optical apparatus comprising:

a primary mirror having a primary reflecting surface provided in an axisymmetric form about an axis of rotational symmetry, the primary mirror being an annular member having an inner periphery and an outer periphery, the inner periphery thereof defining an aperture on the axis of rotational symmetry through which light is to be reflected, the primary reflecting surface having a radial curvature from the inner periphery to the outer periphery and a circumferential curvature that is perpendicular to the radial curvature, the primary mirror being constructed and arranged to receive incident light from an observed object and to reflect the incident light from the primary reflecting surface as primary reflected light;

a secondary mirror having a secondary reflecting surface provided in an axisymmetric form about the axis of rotational symmetry, the secondary mirror disposed with the secondary reflecting surface facing the primary reflecting surface, the secondary reflecting surface being constructed and arranged to reflect the primary reflected light as secondary reflected light and to focus the secondary reflected light on a view point that is positioned on the axis of rotational symmetry; and an optically transparent cover constructed and arranged to support the primary mirror and the secondary mirror relative to each other so that the secondary mirror is axially aligned with the aperture, wherein the radial curvature and the circumferential curvature each has a shape defined by a second-order derivative of an equation for a curve, the primary surface having a convex shape relative to the incident light received thereon in a radial direction, a sectional shape of the primary mirror being defined by an equation $y=f_1(x)$ under a condition that an incident angle θ a sectional shape of the secondary mirror and a relationship defined by $θ=g(φ)$ are satisfied, $f_1(x)$ being determined by numerically integrating a first order derivative $f'_1(M_x)$ defined as follows:

$$f'_1(M_x) = \frac{D\cos\phi - M_y - \sqrt{D^2 - 2(M_x\sin\phi + M_y\cos\phi)D + M_x^2 + M_y^2} \quad (\cos\theta)}{D\sin\phi - M_x - \sqrt{D^2 - 2(M_x\sin\phi + M_y\cos\phi)D + M_x^2 + M_y^2} \quad (\sin\theta)}$$

from a point $M_1$ on the inner periphery of the primary mirror to a point $(M_x, M_y)$, wherein $(M_x, M_y)$ is a coordinate point on the primary reflecting surface, θ is an incident angle of the incident light to the primary mirror, φ is an incident angle of the secondary reflected light from the secondary mirror to the view point, P is a point on the secondary reflecting surface, and D is a distance between the viewpoint and P.

19. The reflection-type angle-of-view-transforming optical apparatus according to claim 18, wherein the cover is shaped as a hemispherical dome.

20. The reflection-type angle-of-view-transforming optical apparatus according to claim 18, further comprising a lens that is fixed to the primary mirror and positioned at the view point to receive the secondary reflected light.

21. The reflection-type angle-of-view-transforming optical apparatus according to claim 20, further comprising a camera that is attached to the lens.

* * * * *